(12) United States Patent
Hollister et al.

(10) Patent No.: US 10,063,515 B2
(45) Date of Patent: Aug. 28, 2018

(54) METHOD OF COMMUNICATING IN A RADIO FREQUENCY IDENTIFICATION SYSTEM USING ALOHA NETWORKS

(76) Inventors: Allen Hollister, La Habra, CA (US); Gary Barta, Duarte, CA (US); John T. Armstrong, Pasadena, CA (US)

( * ) Notice: Subject to any disclaimer, the term of this patent is extended or adjusted under 35 U.S.C. 154(b) by 882 days.

(21) Appl. No.: 11/698,242

(22) Filed: Jan. 26, 2007

(65) Prior Publication Data
US 2008/0180222 A1    Jul. 31, 2008

(51) Int. Cl.
*H04L 29/12* (2006.01)
*H04L 29/08* (2006.01)

(52) U.S. Cl.
CPC .... *H04L 61/2046* (2013.01); *H04L 29/12264* (2013.01); *H04L 67/12* (2013.01)

(58) Field of Classification Search
CPC ........... H04L 61/2046; H04L 29/12264; H04L 67/12; G06K 7/10019; G06K 7/10029; G06K 7/10039
See application file for complete search history.

(56) References Cited

U.S. PATENT DOCUMENTS

| | | | |
|---|---|---|---|
| 4,818,855 A | 4/1989 | Mongeon et al. | 235/440 |
| 2006/0224647 A1* | 10/2006 | Gutnik | 708/250 |
| 2007/0085661 A1* | 4/2007 | Yamazoe et al. | 340/10.1 |
| 2007/0096877 A1* | 5/2007 | Quan et al. | 340/10.2 |
| 2007/0126555 A1* | 6/2007 | Bandy | 340/10.2 |

* cited by examiner

*Primary Examiner* — Steven Lim
*Assistant Examiner* — Sara Samson
(74) *Attorney, Agent, or Firm* — Pasadena Legal Group; Norman R. Van Treeck

(57) ABSTRACT

A method is presented for taking an unknown field of transponders and converting them to a slotted Aloha architecture and increasing the throughput allowed by the slotted Aloha architecture by using several different techniques including shortening the time of empty and collided timeslots, implementing a unique random number generator that creates random numbers that are uniquely based on an individual tags location, and on an ability to estimate the total number of transponders and control the offered rate such that throughput is always maximum. While these techniques work well together and produce the most benefit when used together, they are independent techniques and any one may be used alone without the others. Thus a system might use the estimated total number of transponders technique and the timeslot shortening technique, but use a standard random number generator rather one based on transponder location with only a small decrease in overall performance.

17 Claims, 25 Drawing Sheets

PRIOR ART

PRIOR ART

METHOD OF COMMUNICATING IN A RADIO FREQUENCY IDENTIFICATION SYSTEM USING ALOHA NETWORKS

FIELD OF THE INVENTION

The present invention relates generally to a method of communicating in a radio frequency identification system using Aloha networks.

BACKGROUND

In applications for identification of persons and things, optical bar coding technology is almost universally employed. Generation of the bar code is very inexpensive but limited. One problem associated with bar codes and bar code readers is that the bar codes must be precisely aligned with the bar code reader in order to be read. In situations requiring generalized scanning, several scanning laser beams are used, each at a different angle of incidence to the object being read. Another problem with bar codes is that the bar codes may become unreadable as a result of damage due to, for example, exposure to moisture, or wear and tear from use. Radio frequency identification ("RFID") tags address some of the shortcomings of bar codes and have been proposed as a replacement for optical bar codes in at least some applications. RFID tags used in bar code applications are sometimes referred to as electronic bar codes.

Remotely powered electronic devices and related systems for powering up and receiving stored information from such devices are well known. For example, U.S. Pat. No. 4,818,855 issued to Mongeon et al., titled, Identification System, discloses a remotely powered identification device which derives power from a remote source via one of an electric field or a magnetic field and which transmits stored information back to the source via the other of the electric field or magnetic field. Remotely powered identification devices of this type are commonly referred to as RFID tags. A power source with a data collection function is known as a tag reader. A power source capable of sending data to a tag is known as a tag writer. A power source capable of bi-directional communication is known as a tag reader/writer.

An ongoing objective in the development of RFID tags and associated readers and/or writers of the general type described above has been to minimize cost and size, and to improve efficiency of operation. The simplest and least expensive RFID systems employ unidirectional communication, allowing data transfer from tag to reader only. These are commonly known as read-only systems. In read-only systems, eliminating the need for a data receiver on the tag minimizes tag cost. Typically, these tags transmit information continuously as long as they receive adequate power from the source, wherein lies the primary system limitation. The reader's receiver is capable of reliably detecting data from only one tag at a time. If multiple tags are present within the reader's field, they will simultaneously transmit and create mutual interference at the reader's receiver, preventing the data from any one tag from being recovered successfully. This mutual interference condition is commonly referred to as a data collision. The terms anti-collision and collision mitigation are used to describe methods employed to prevent or minimize the impact of such data collisions at the reader.

Prior RFID systems have used the Aloha protocol for anti-collision. The Aloha protocol requires substantial bi-directional communication between the reader and the tags. The Aloha protocol sorts through a population of RFID tags and assigns each tag a unique node address. This node address is subsequently used to provide collision free communication between the tags and the reader. The reader sends out a request command to all tags in the field. The tags react to the request command by selecting a random number. This random number defines the tag's channel identification or slot number. The reader polls the tags in the field looking for a response. The reader starts by polling for slot number 0. All tags that have chosen a random number of 0 respond. If exactly one tag responds, then the reader assigns a unique node address to that tag. If more than one tag responds, a collision will occur. The reader will ignore this indecipherable response. If no tags respond, the reader moves onto the next slot. This process continues by polling for slot number 1. Again, if a single response occurs, the tag is assigned a unique node address; otherwise, the polling sequence proceeds with the reader polling for the next slot number. Upon reaching the last slot, the reader can start over by requesting tags that have not been assigned a node address to select a new random number. The entire polling process is repeated until all tags in the field have been assigned unique node addresses. At this point, the reader can select an individual tag for subsequent communication by specifying its unique node address, providing a collision-free communication channel.

A problem with the Aloha network scheme is that if there are many devices, or potentially many devices in the field (i.e. in communications range, capable of responding) then there must be many available slots or many collisions will occur. Having many available slots slows down replies. If the magnitude of the number of devices in a field is unknown, then the optimum number of slots needed is also unknown, and the system chooses a large number of slots, in an attempt to choose a number larger than three times the number of devices in the field. If the size is grossly overestimated, the system will slow down significantly because the reply time equals the number of slots multiplied by the time period required for one reply. Therefore a need exists to increase throughput well above the theoretical time that would be allowed by a standard slotted Aloha network scheme.

SUMMARY

A method is presented for taking an unknown field of transponders and converting them to a slotted Aloha architecture and increasing the throughput allowed by the slotted Aloha architecture by using several different techniques including shortening the time of empty and collided timeslots, implementing a unique random number generator that creates random numbers that are uniquely based on an individual tags location, and on an ability to estimate the total number of transponders and control the offered rate such that throughput is always maximum. While these techniques work well together and produce the most benefit when used together, they are independent techniques and any one may be used alone without the others. Thus a system might use the estimated total number of transponders technique and the timeslot shortening technique, but use a standard random number generator rather one based on transponder location with only a small decrease in overall performance.

Other features and advantages will be apparent to one skilled in the art given the benefit of the following disclosure.

and $$\frac{n_x}{n_t}$$

Figure 13:
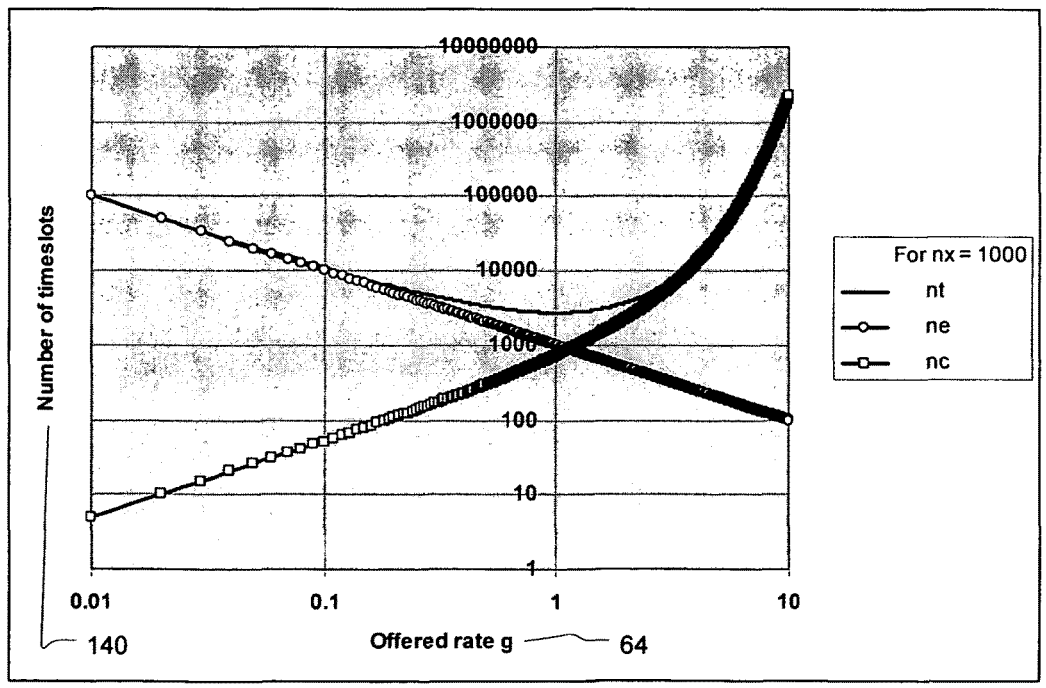
Figure 14:
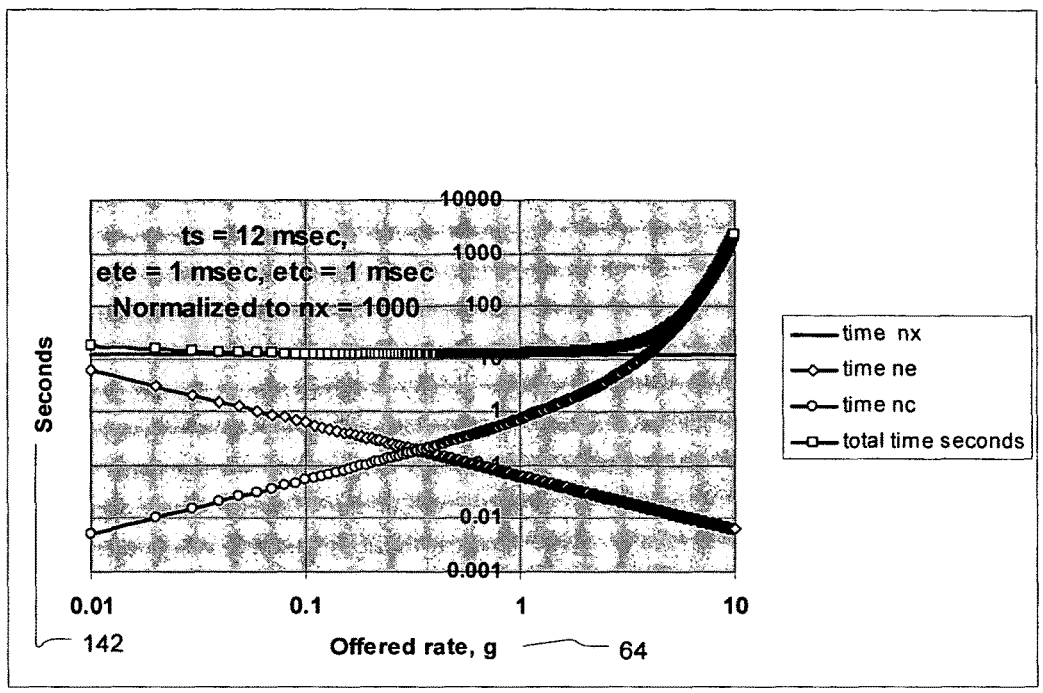
Figure 15:
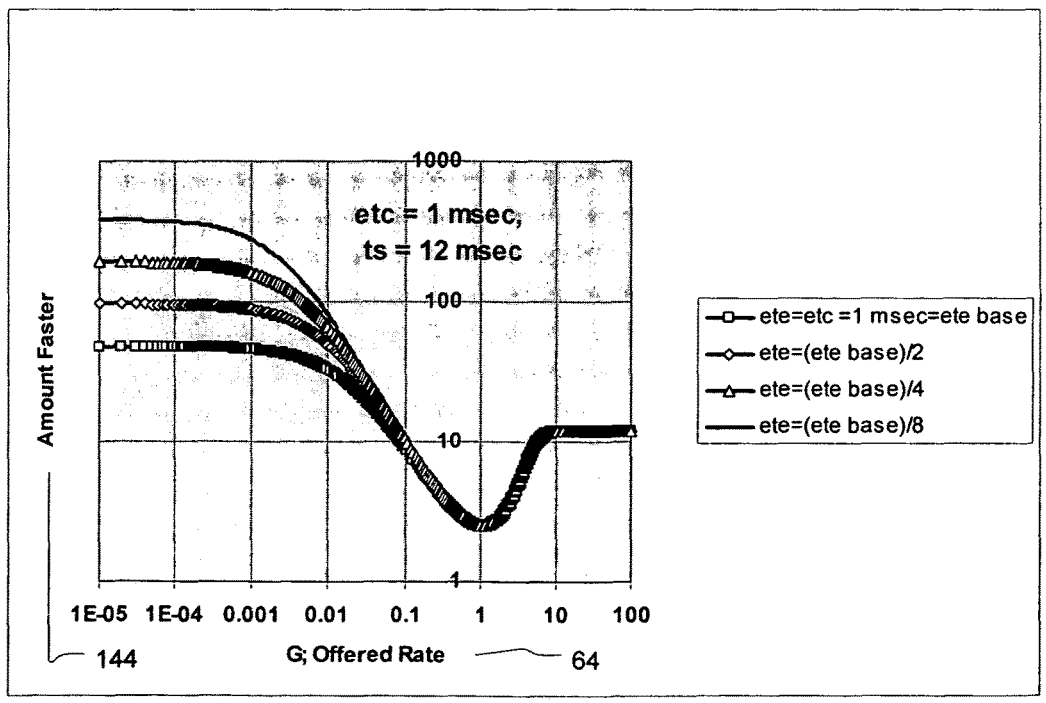
Figure 16:
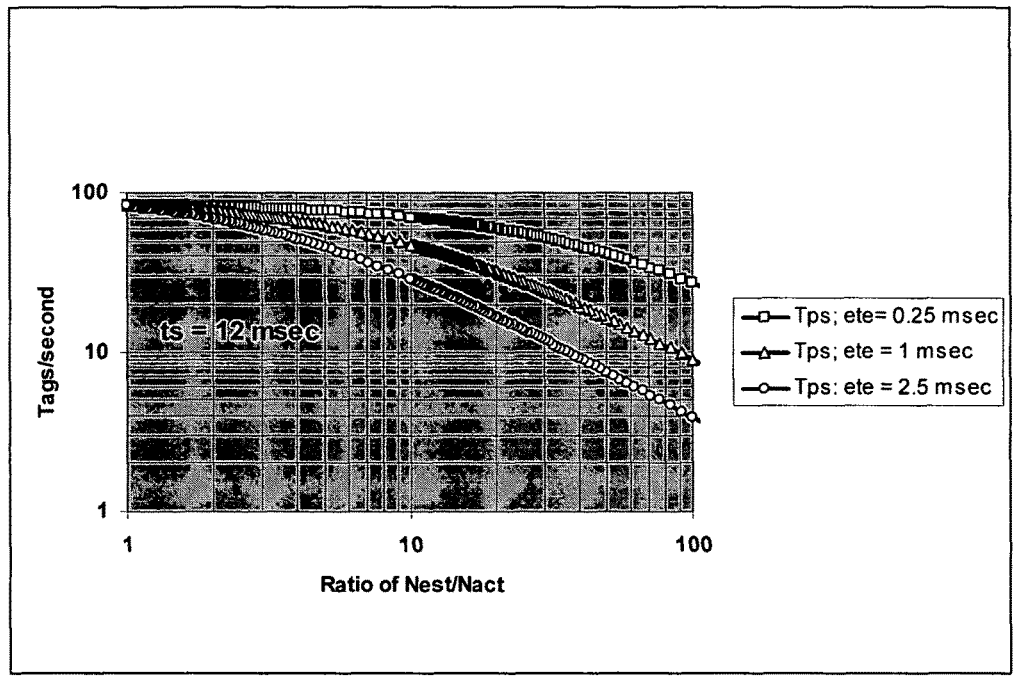
Figure 17:
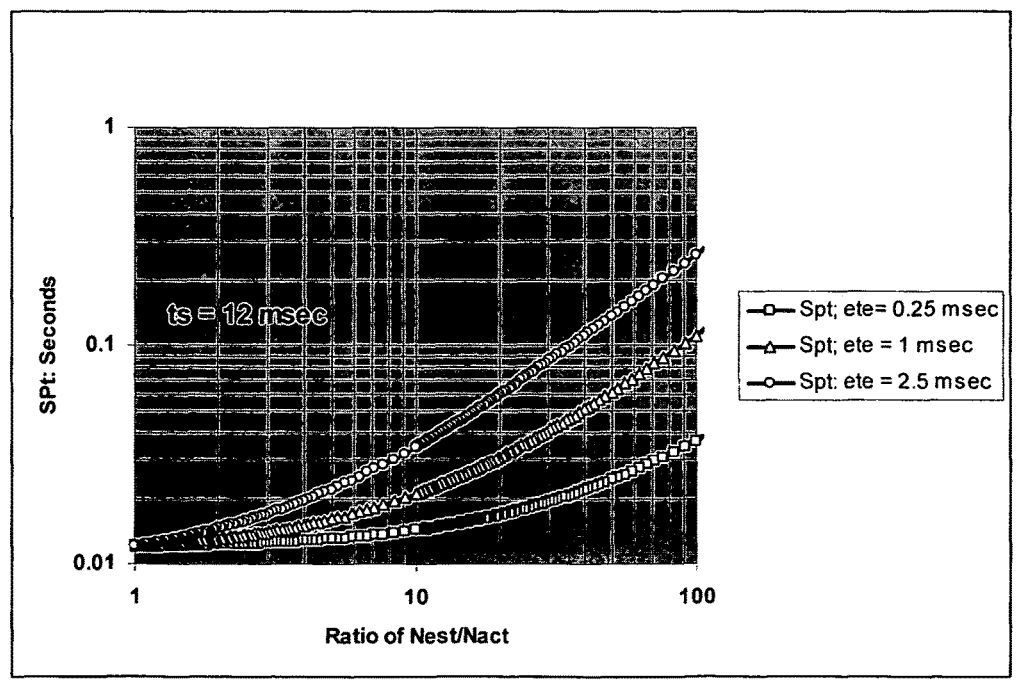
Figure 18:
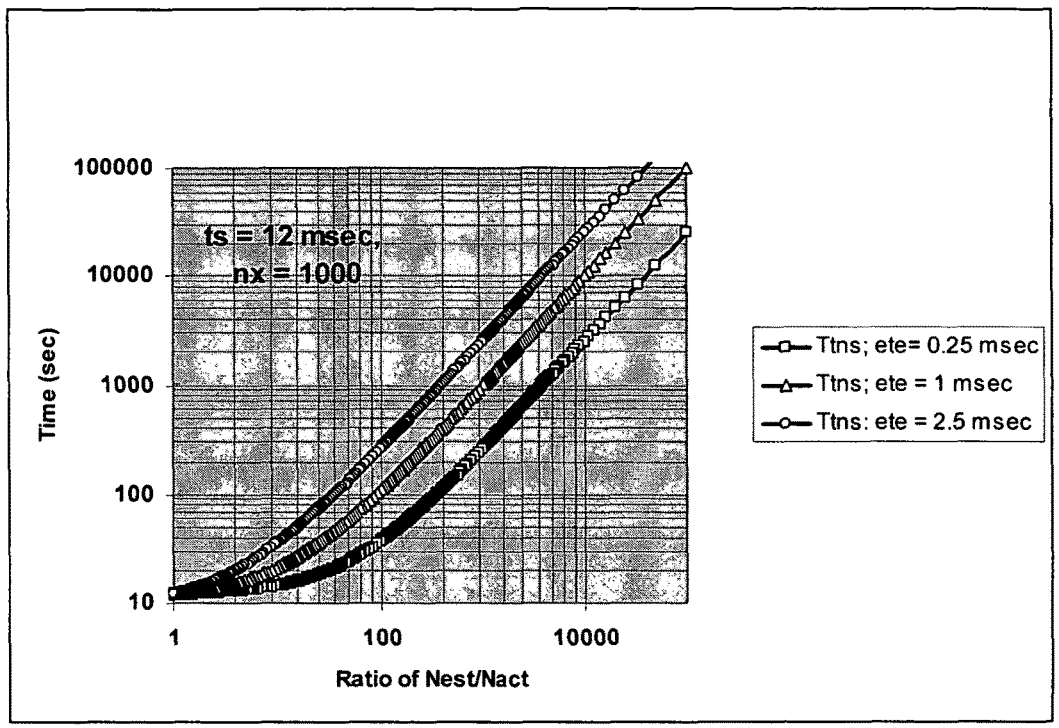
Figure 19:
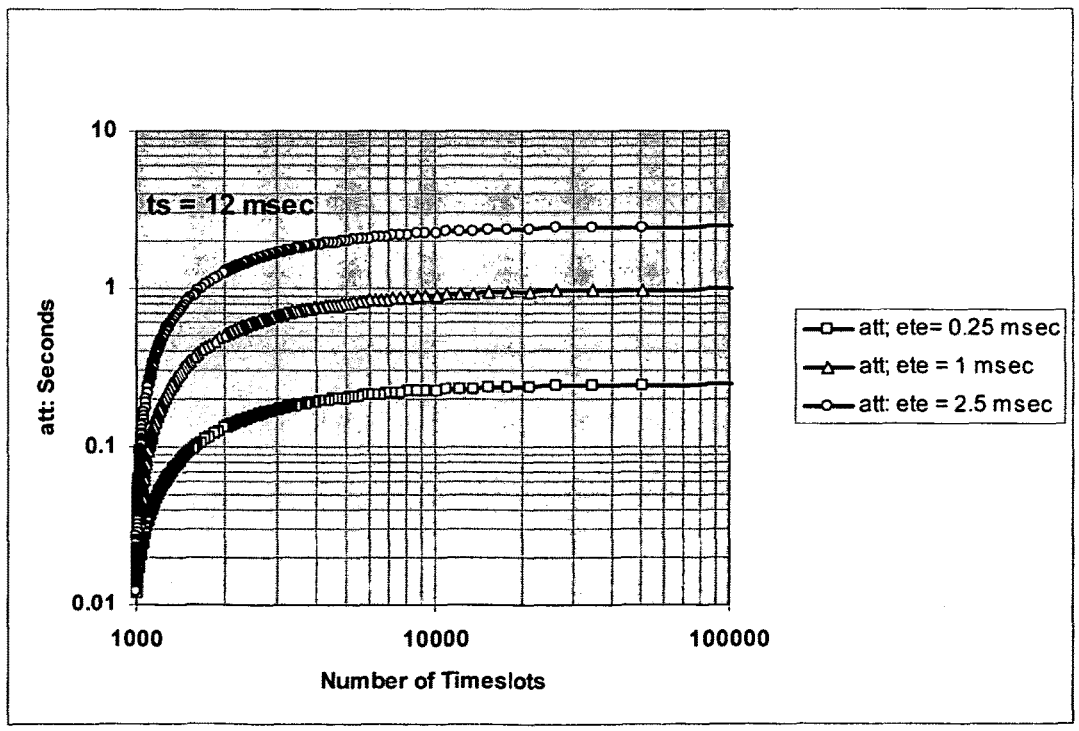
Figure 20:
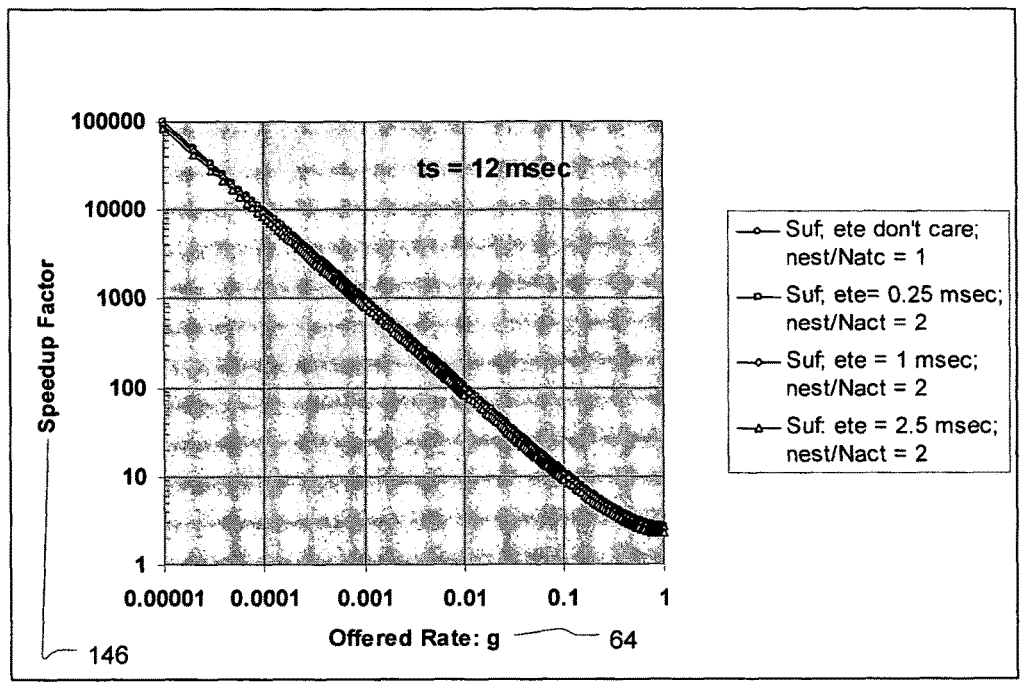
Figure 21:
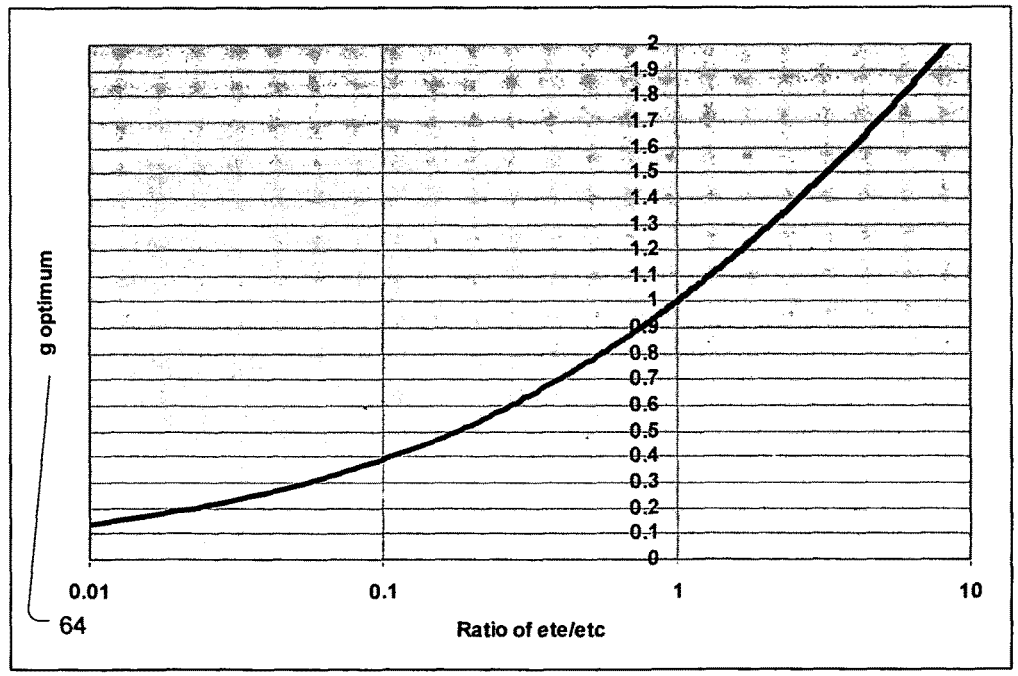
Figure 22:
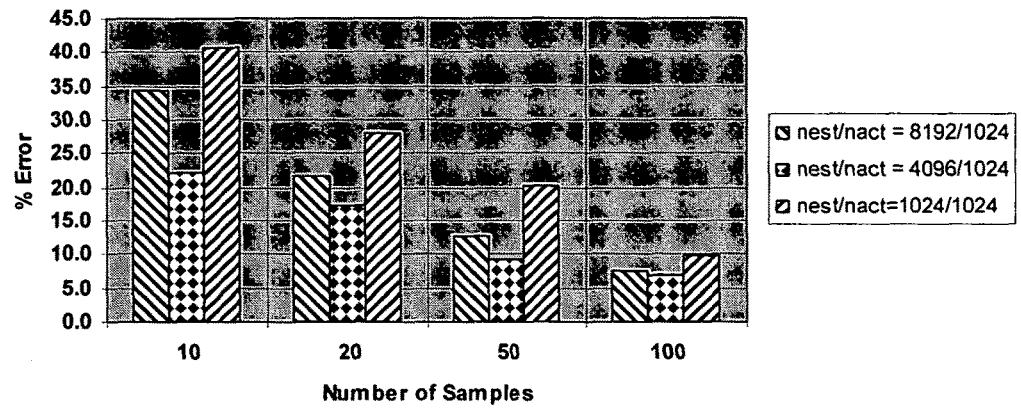
Figure 23:
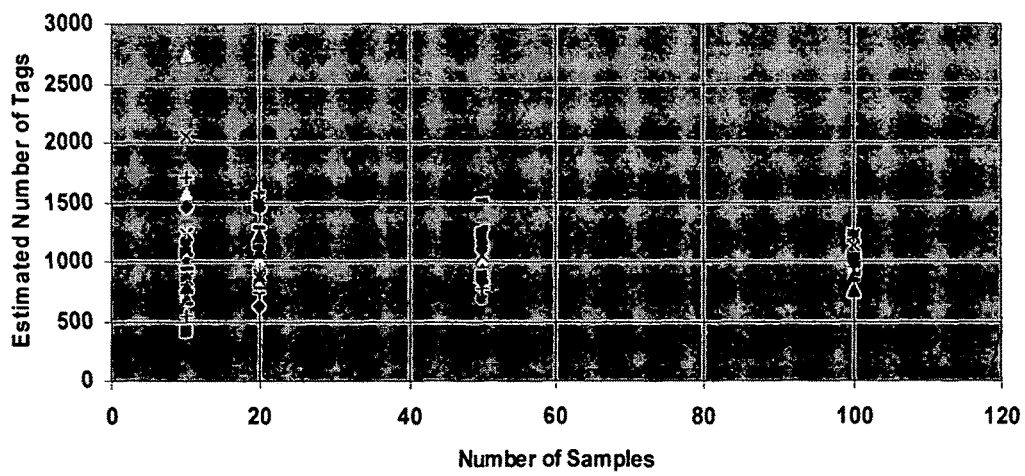
Figure 24:
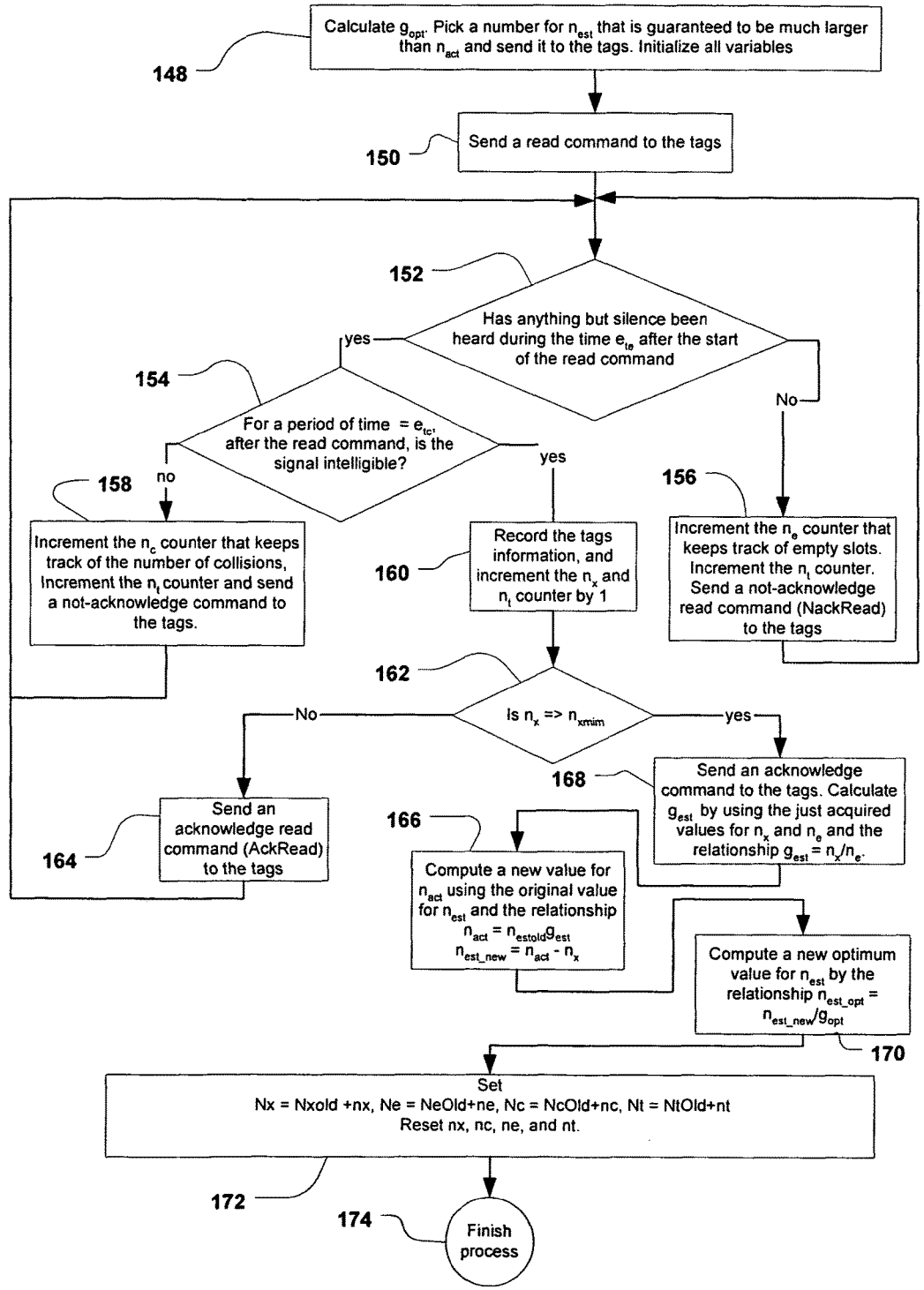
Figure 25:
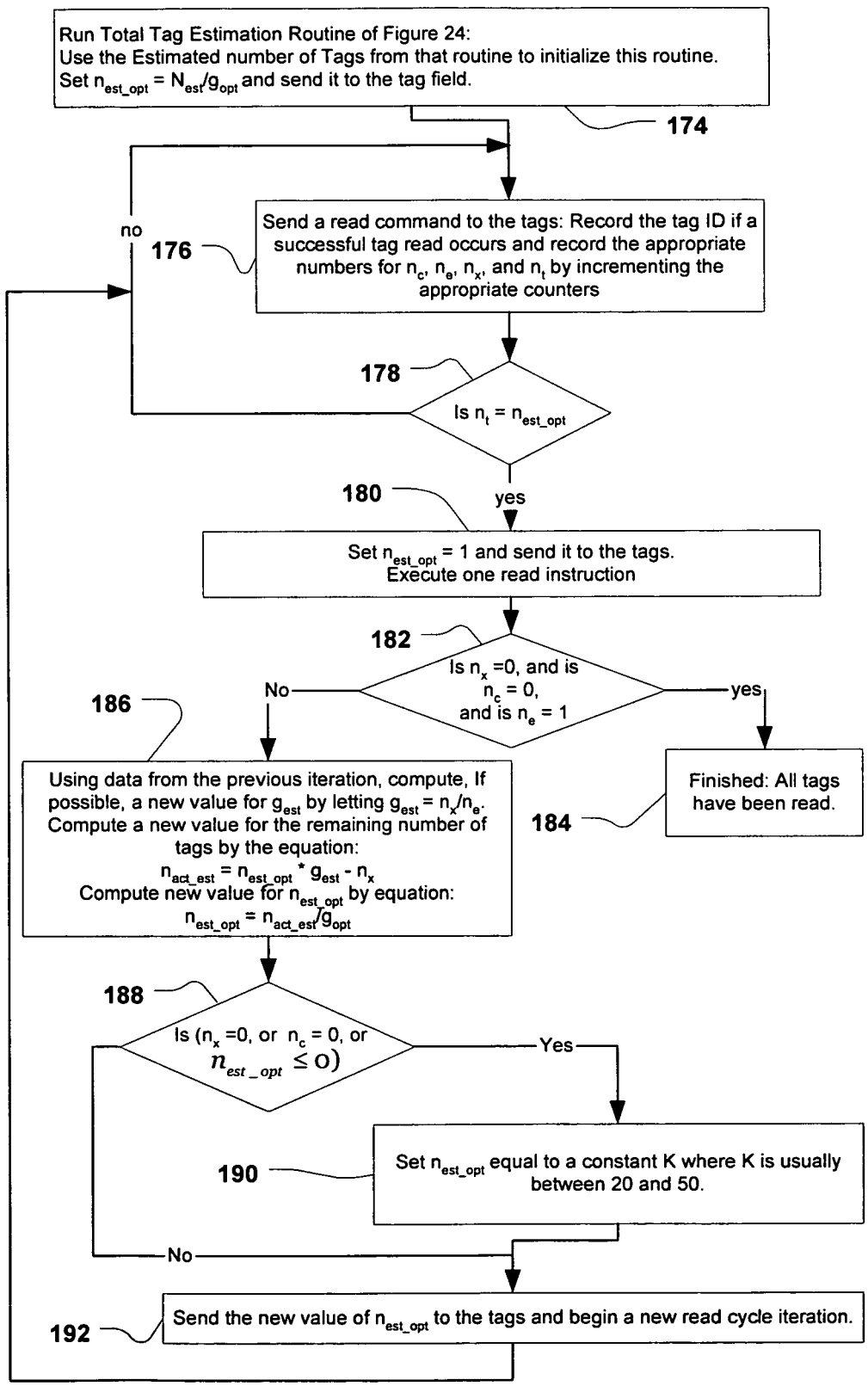
Figure 26:
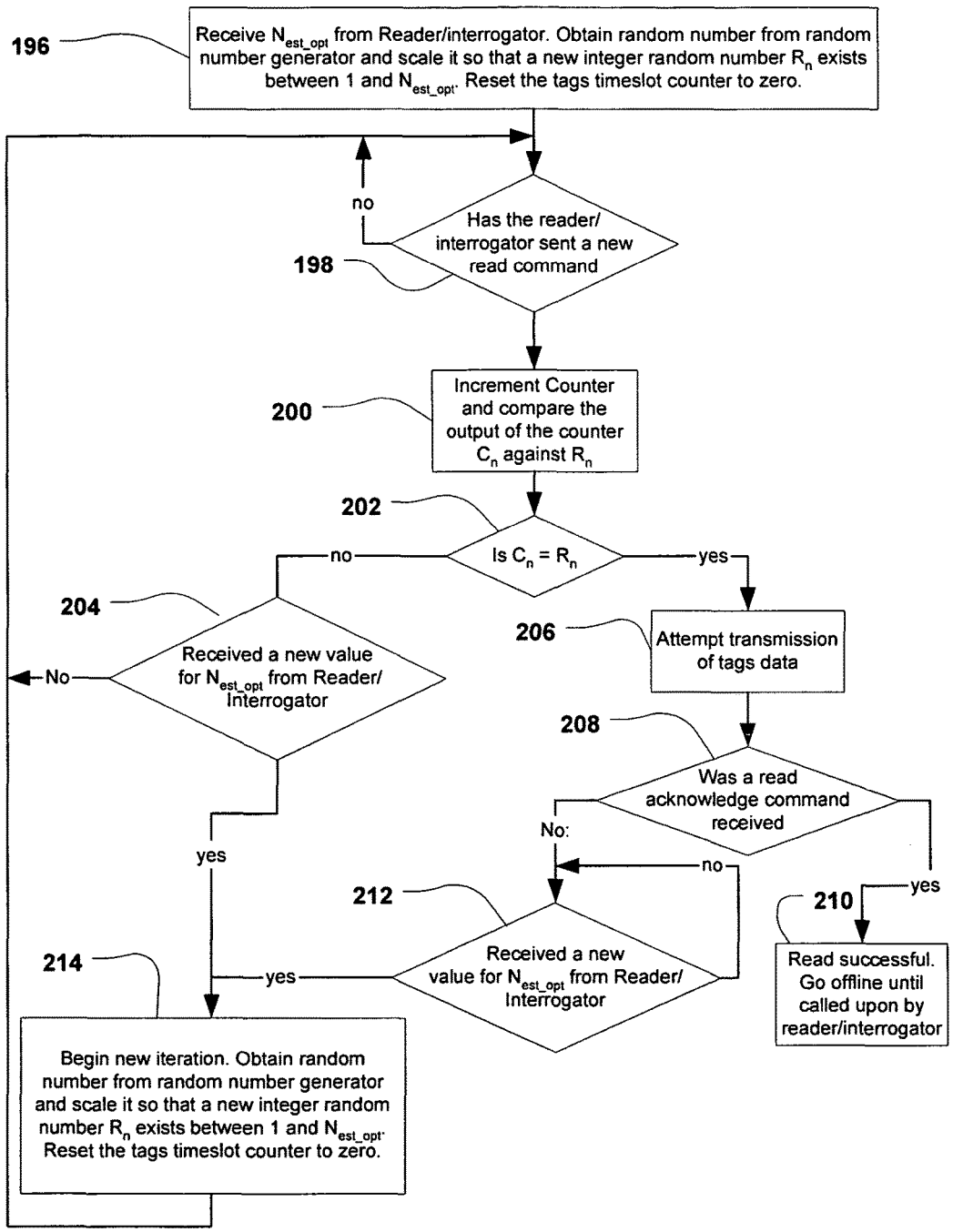
Figure 27:
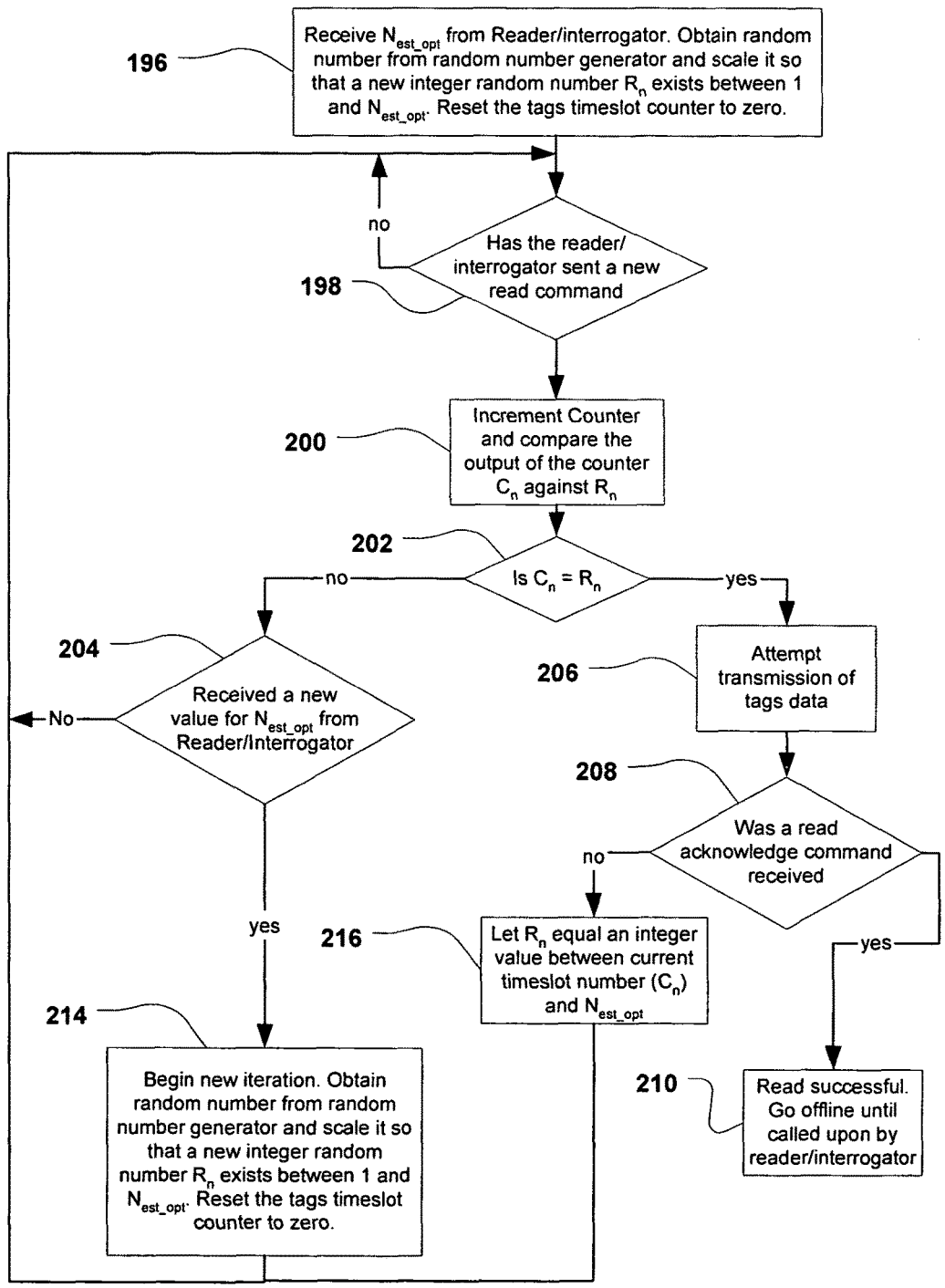
Figure 28A:
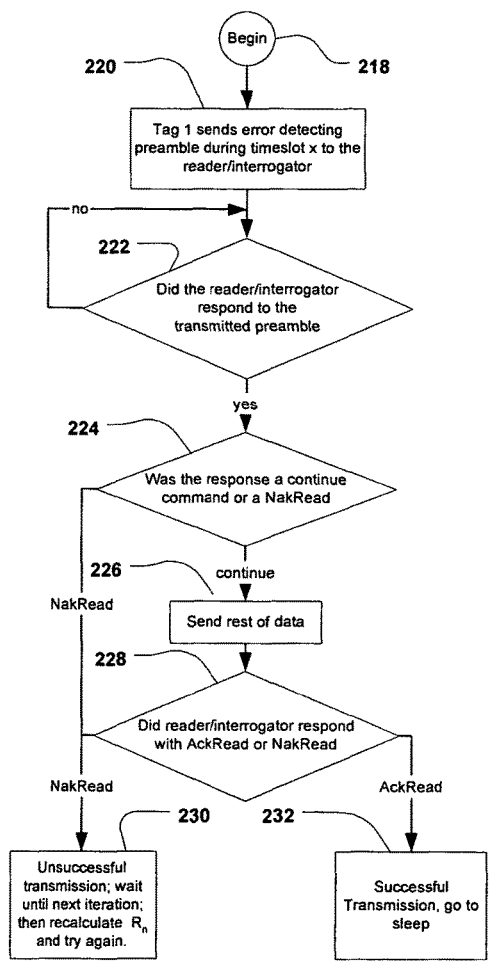
Figure 28B:
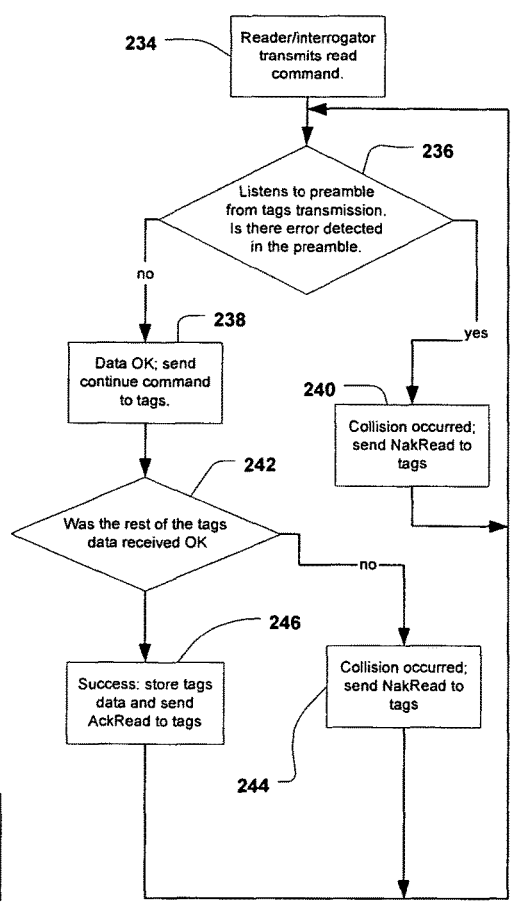
Figure 29:
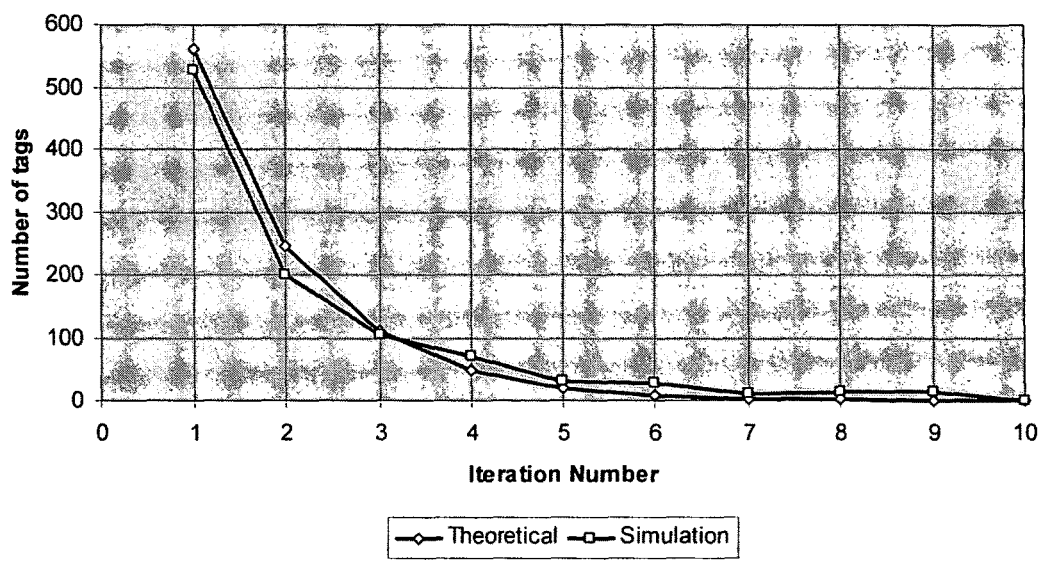
Figure 30:
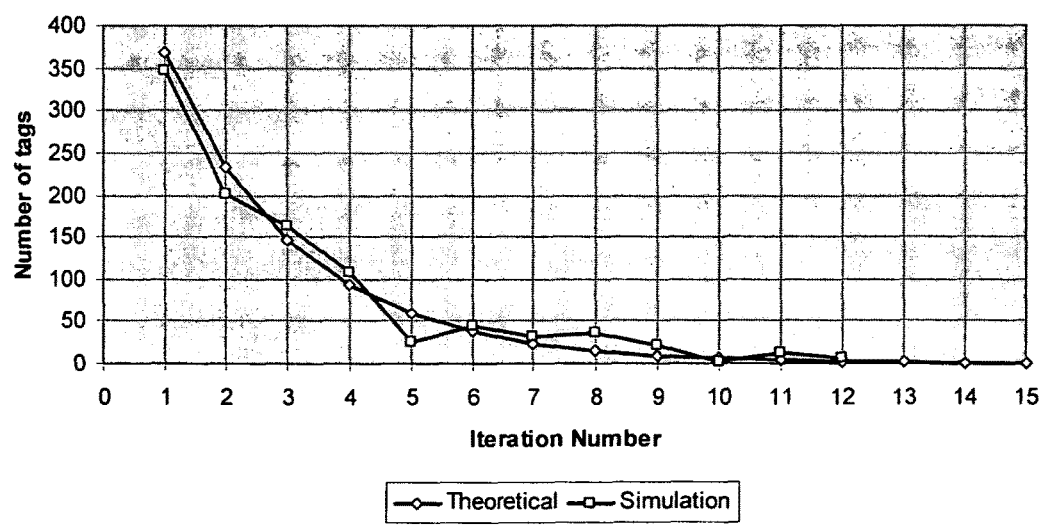
Figure 31:
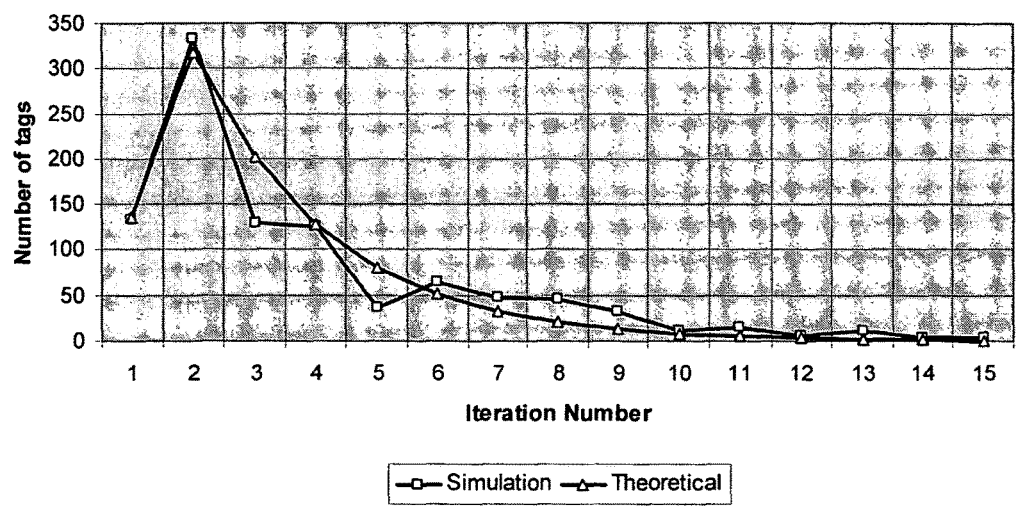
Figure 32:
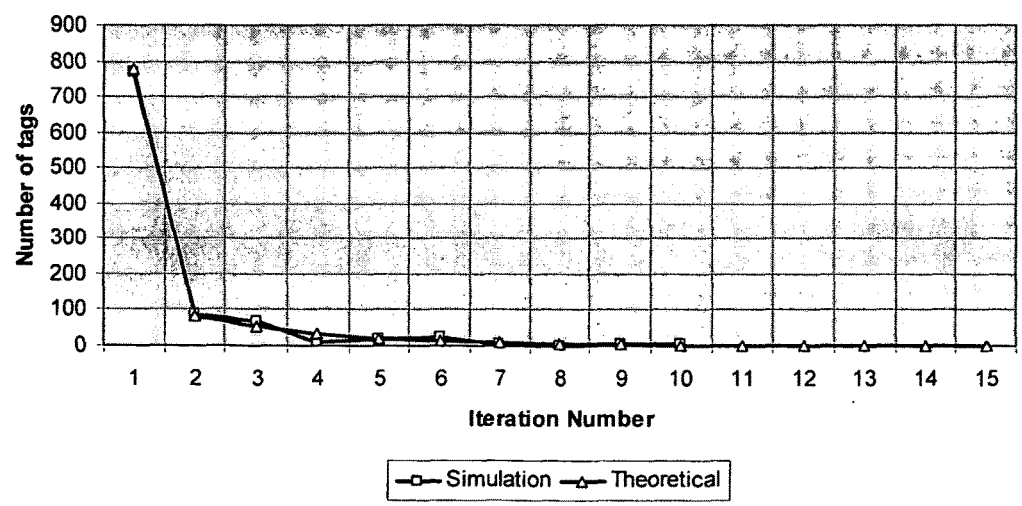
Figure 33:
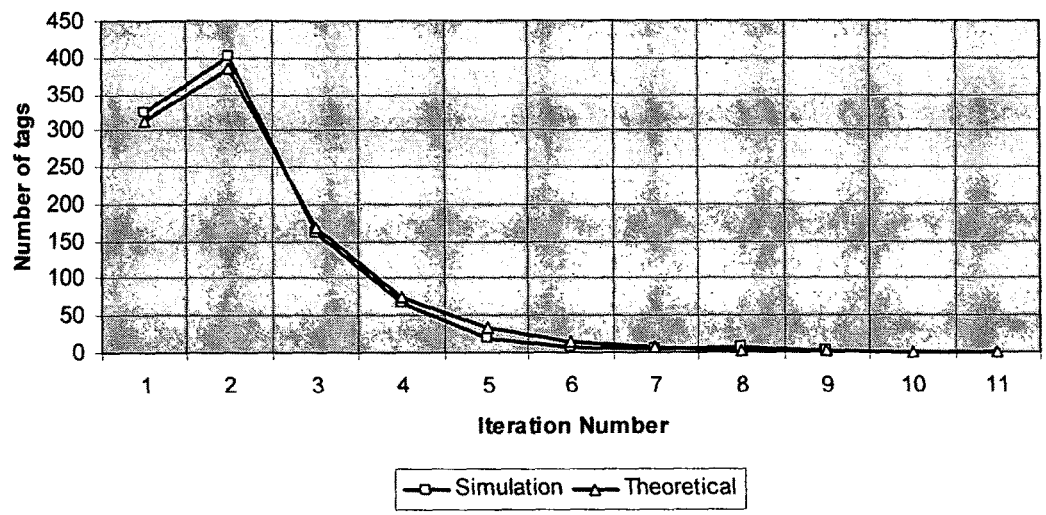
Figure 34:
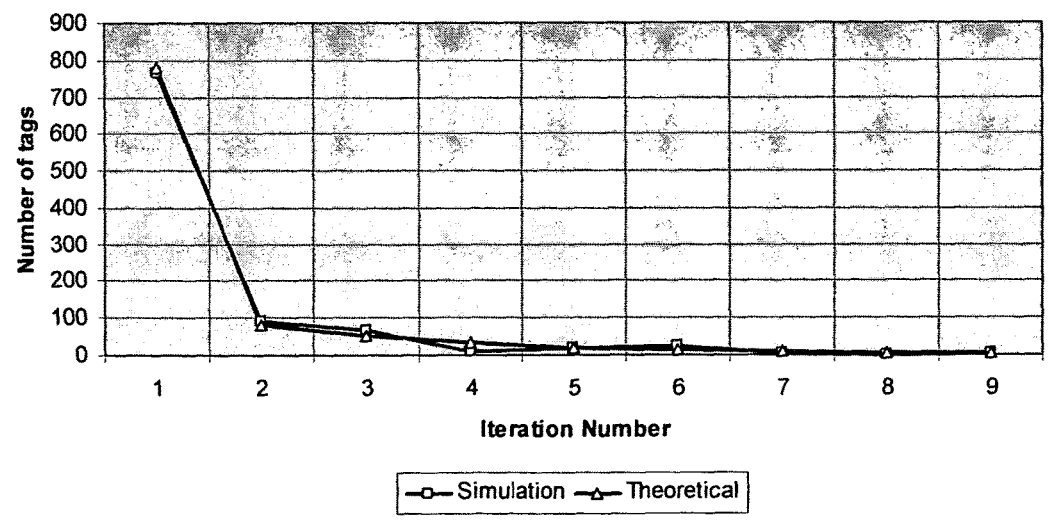
Figure 35:
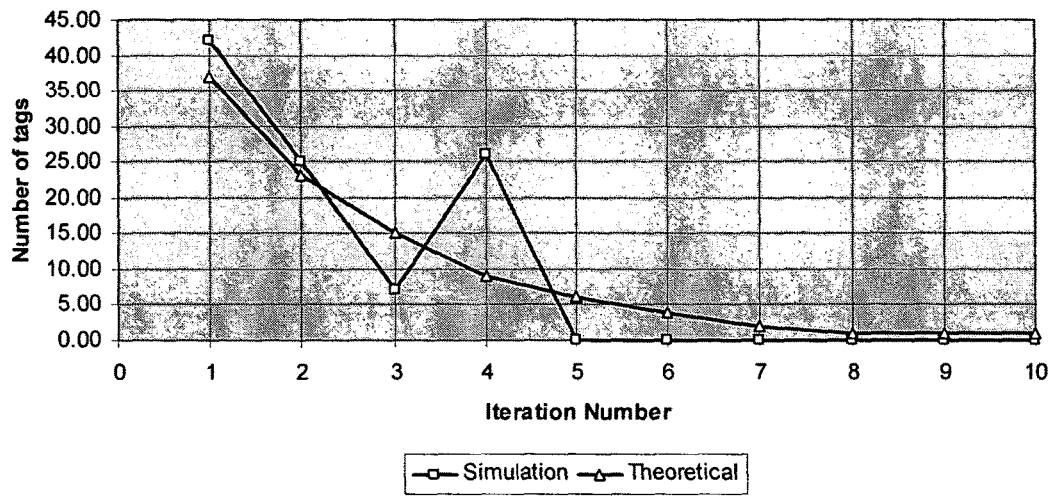
Figure 36:
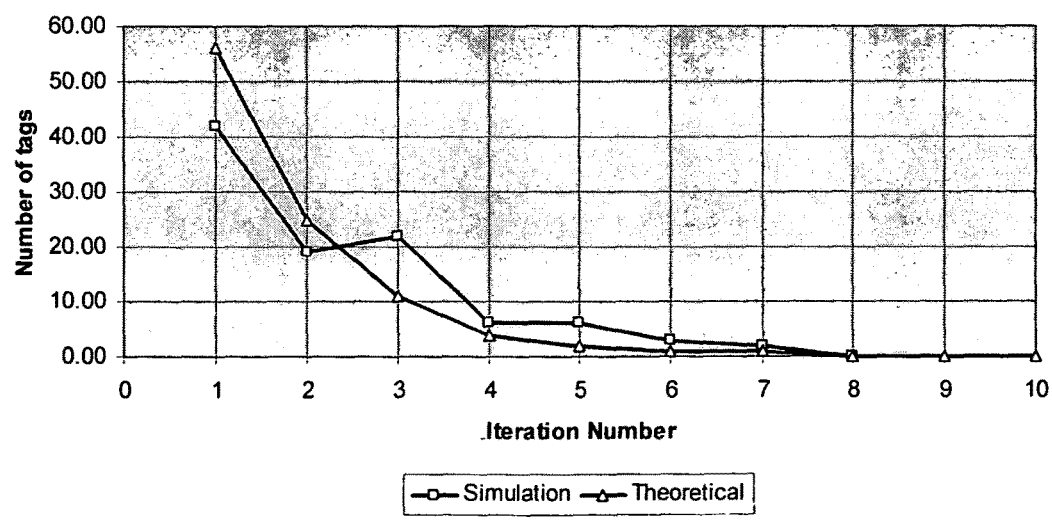
Figure 37:
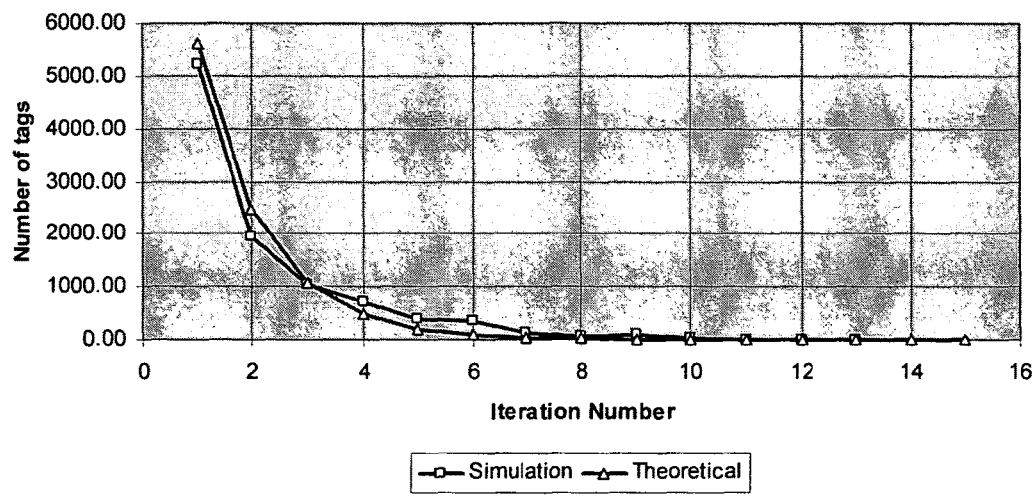
Figure 38:
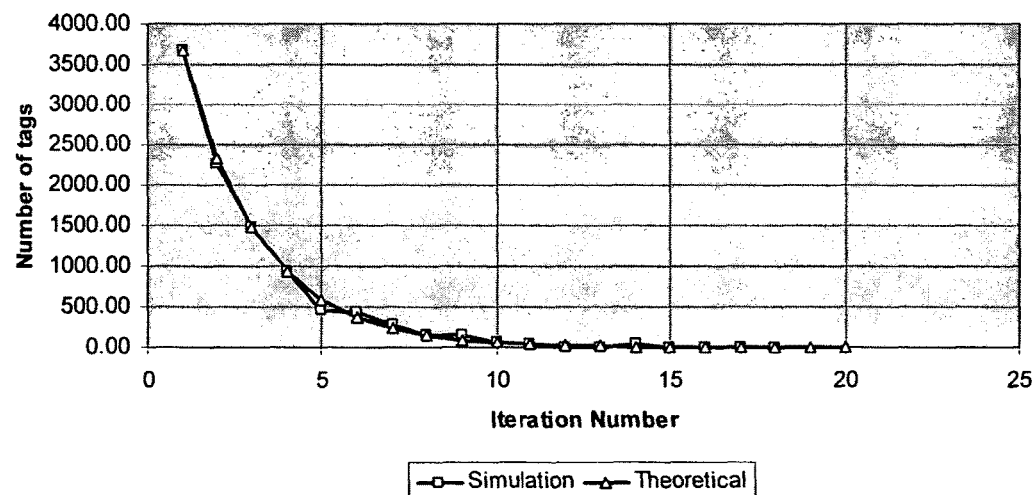
Figure 39:
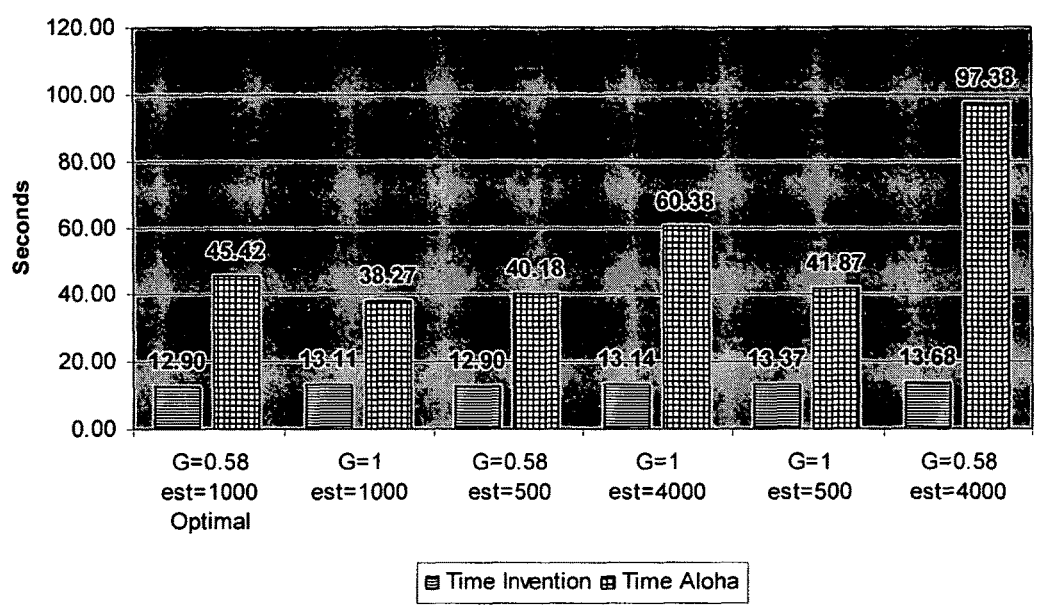

vs. the offered rate g;

FIG. 13 graphically illustrates $n_t$, the total number of timeslots, $n_e$, the number of empty timeslots in $n_t$, and $n_c$, the number of unsuccessful timeslots due to collisions in $n_t$, vs. the offered rate g;

FIG. 14 graphically illustrates time to read $n_x$, $n_e$, $n_c$, and $n_t$ when $n_x$=1000 tags vs. the offered rate g;

FIG. 15 graphically illustrates speedup factor in throughput for the invention over that of the slotted Aloha vs. the offered rate g;

FIG. 16 graphically illustrates the throughput in tags/second versus the ratio of $$\frac{n_{est}}{N_{act}}$$

for three different values of $e_{te}$, the time required to read an empty timeslot;

FIG. 17 graphically illustrates the seconds/tag under the same conditions as the throughput graph of FIG. 16;

FIG. 18 graphically illustrates the time required to read 1000 tags when this technique is employed;

FIG. 19 graphically illustrates $a_{tt}$ the time/timeslot for this technique;

FIG. 20 graphically illustrates the throughput improvement, Speedup Factor 146 over that of a slotted Aloha vs. the offered rate g;

FIG. 21 graphically illustrates an optimum point by taking the derivative of $t_{ps}$ with respect to g; setting it equal to zero and solving for g;

FIG. 22 graphically shows the average error in the estimate of the total number of tags vs. $n_{xmin}$;

FIG. 23 graphically shows the statistical estimate of the total number of tags vs $n_{xmin}$ sample values of 10, 20, 50, and 100 samples. $n_{xmim}$ is the number of samples considered to be a minimum to accurately estimate $n_{act}$;

FIG. 24 is a flowchart of this process to estimate the tag size;

FIG. 25 is a flowchart for the process defined as technique 1;

FIG. 26 is a flowchart for the process showing what the tag does while using technique 1;

FIG. 27 is a flow chart for the tag process as defined as technique 2;

FIG. 28A is a flowchart for the process to determine a collided timeslot;

FIG. 28B is a flowchart for using the result from FIG. 28A to terminate the timeslot early;

FIGS. 29 through 38 are graphs of the number of tags acquired during each iteration for technique 1; and FIG. 39 graphically illustrates simulation data showing the time to acquire 1000 tags using the invention vs. a Slotted Aloha for various values of offered rate g.

DETAILED DESCRIPTION OF THE DRAWINGS

Figure 1:
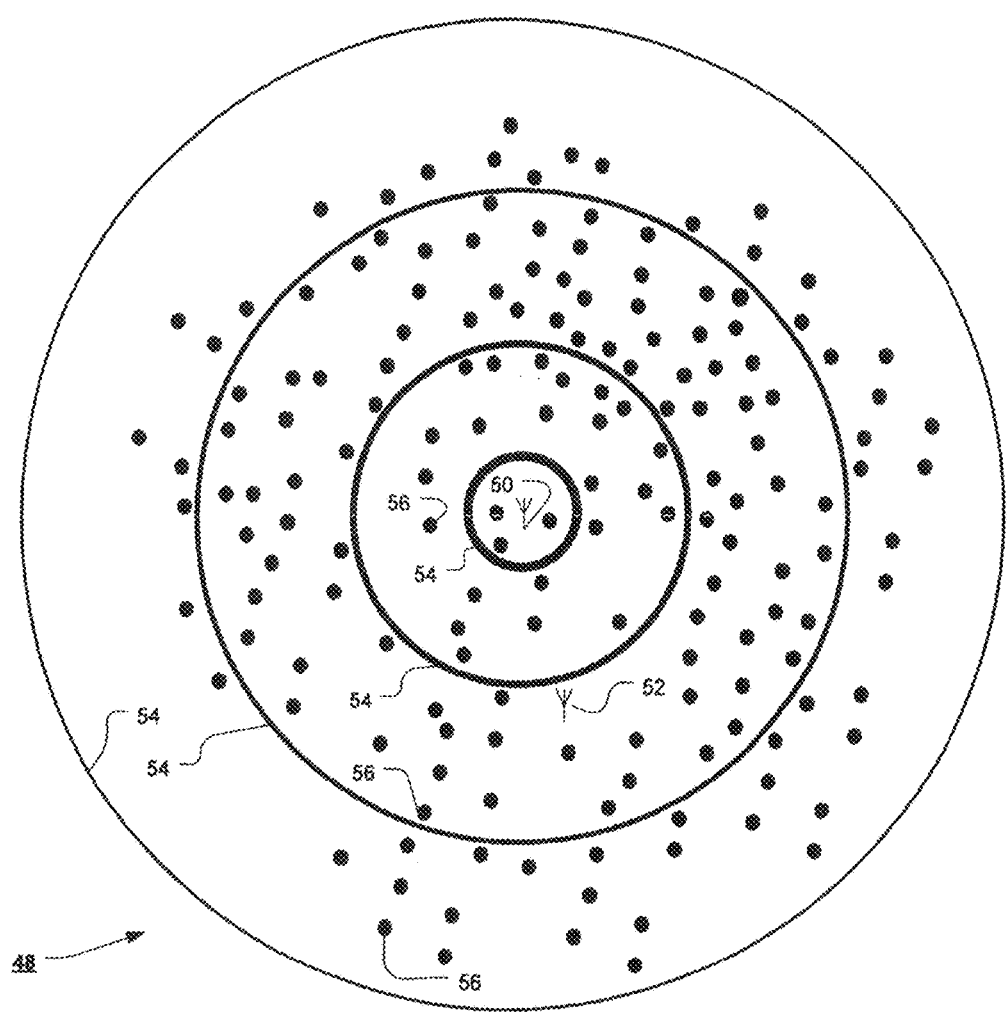
FIG. 1 graphically illustrates a system for identifying RFID tags in a high tag density environment.

FIG. 1 graphically illustrates a simplified prior art system 48 for identifying RFID tags 56 in a high tag density environment having unequally spaced RFID tags 56 using isotropic transmit and receive antennas 50 and 52. The transmit antenna 50 emits an RF wavefront 54 which acts as an RF interrogation signal 54. This interrogation signal 54 causes all the RFID tags 56 within the transmitting radius to respond by sending an encoded RF signal with the tags ID number and optionally other data stored on the tag 56. The receive antenna 52 then receives this encoded signal response from the tag 56 and sends it on to the rest of the system 48. The receive antenna 52 may be separate from or part of the structure containing the transmit antenna 50. When multiple tags all transmit at the same time, they interfere with each other causing read errors, which in turn causes many retransmits to occur. In the worst-case, the number of successful reads goes to zero.

Figure 2:
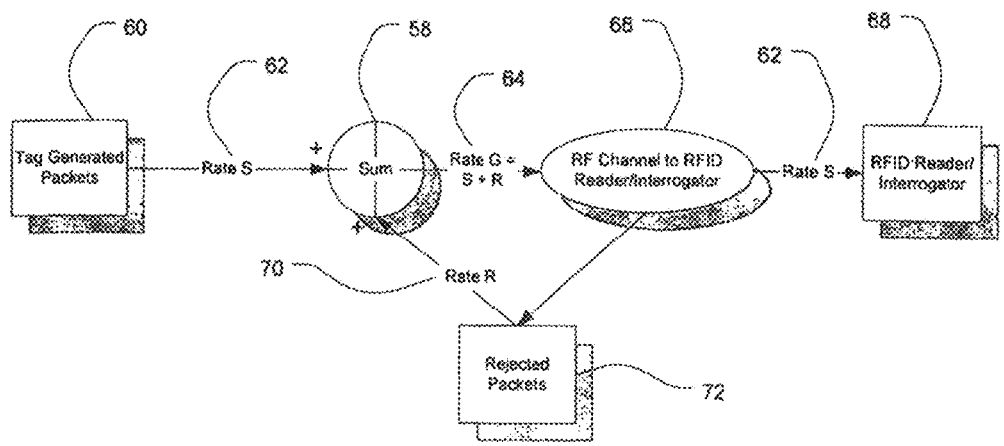
FIG. 2 shows a system block diagram for implementing an Aloha network.
Figure 3:
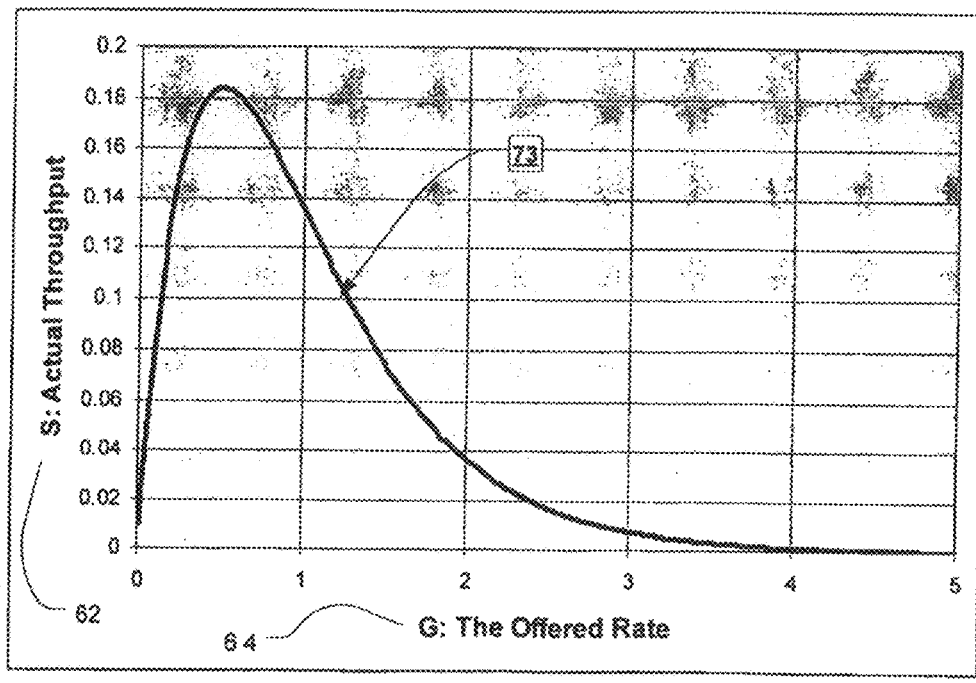
FIG. 3 graphically illustrates throughput for a pure Aloha network.

A solution to this problem is to move the system into what is called a pure Aloha network. This is accomplished by having each tag generate a random number that is represented in seconds. After a command "send ID number" is sent, each tag waits a period of time equal to its random number before attempting to communicate its ID number. More specifically, some of the ID numbers would get through, but many would still collide as those with similar random delays would still collide. In addition, there would be times when no tags were attempting to communicate because no tag would have a random number that was equal to a particular time. If the total period of time allowed is too long for the number of tags, then throughput (the number of tags/second) will be low because much of the time will have no tags attempting to communicate because none had a random time equal to that particular time. On the other hand, if the total time was too short for the total number of tags, then the throughput will be low because many tags will have the same random number with the result being a lot of garbled messages due to collisions of two or more tags attempting to communicate at the same time. The system model for this is shown in FIG. 2. FIG. 3 is a graph of the normalized throughput (Actual Throughput, S 62 vs. Offered Rate, G 64) for this particular system (which is well known in the literature as a pure Aloha network).

Referring to FIG. 2 the tags 60 generate communication attempts at a non-uniform or random process rate, S 62 which by way of example will be a Poisson distribution. The communication channel 66 is able to accept and transmit a certain number of tags/second (bit/second) raw data rate, but it cannot accommodate two or more tags arriving at the same time. If this happens, those communication packets 72 are rejected and they go back into the queue for another transmission attempt at a later time. This reject rate, R 70 is also not uniform, and for purposes of illustration will also be a Poisson distribution. The Rates S 62 and R 70 are summed 58 together to produce an offered rate, G 64 to the channel 66 for transmission. The output of the channel is a stream of successfully transmitted tags that are at rate S 62 (if this can't be met, then tags are lost as the networks raw bit rate will not carry the load.) The output of the channel 66 feeds into the reader/interrogator 68 at rate S 62 that remains a Poisson distribution.

As noted earlier, because of the Poisson distributed rates, the throughput 73 for this network is plotted in FIG. 3 as a function of the offered rate, G 64. Observe that for high values of G 64, throughput falls off dramatically because of collisions, while at low values of G 64; throughput falls off dramatically because of empty times with no responses. The peak rate is only 18% of the communication channel's 66 possible rate. So if the communication channel is capable of a raw data rate of 100 tags/second, the pure Aloha network is capable of only 18 tags/second; and that is at one value for G 64, (G=0.5). Since G 64 is dependent on knowing the number of tags in the tag field (often which is unknown), the actual data rate may be much smaller than even the 18 tags/second. A solution to this problem is to go to a Slotted Aloha network.

Figure 4:
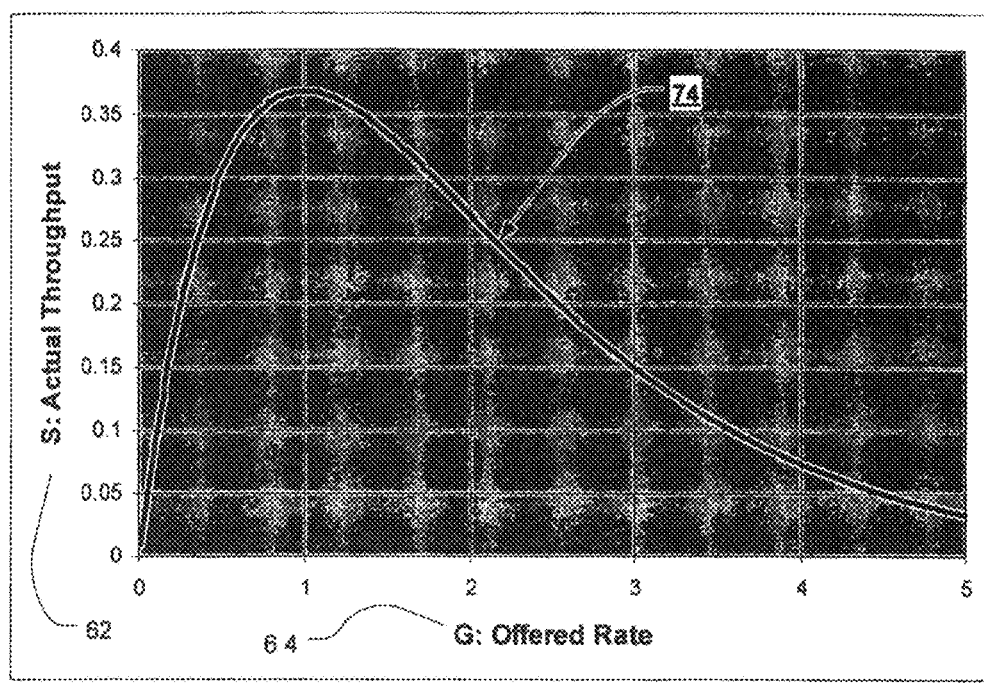
FIG. 4 graphically illustrates throughput for a slotted Aloha network.

In the pure Aloha network, the random times that a tag may begin to communicate may be any time. Hence, if one tag's transmission is just ending and another is just beginning, any amount of overlap still causes a collision. Essentially, the width for two separate tag transmissions must be allowed to prevent a collision. In a slotted Aloha, a tag still has a random number for time, but is now required to begin a transmission only on a particular time boundary. This time is referred to as a timeslot wherein its beginning time is dictated by a central controller and for the case of the RFID system, the reader/interrogator. The random numbers on the tag no longer represent time in seconds, but instead time in timeslots. A graph of the throughput 74 for a slotted Aloha is shown in FIG. 4. Since there are no partial collisions, the optimum throughput in a slotted Aloha system is twice the rate of pure Aloha. Also, the optimum throughput in a slotted Aloha system occurs at an offered rate of 1 as opposed to 0.5 in a pure Aloha system.

Figure 5:
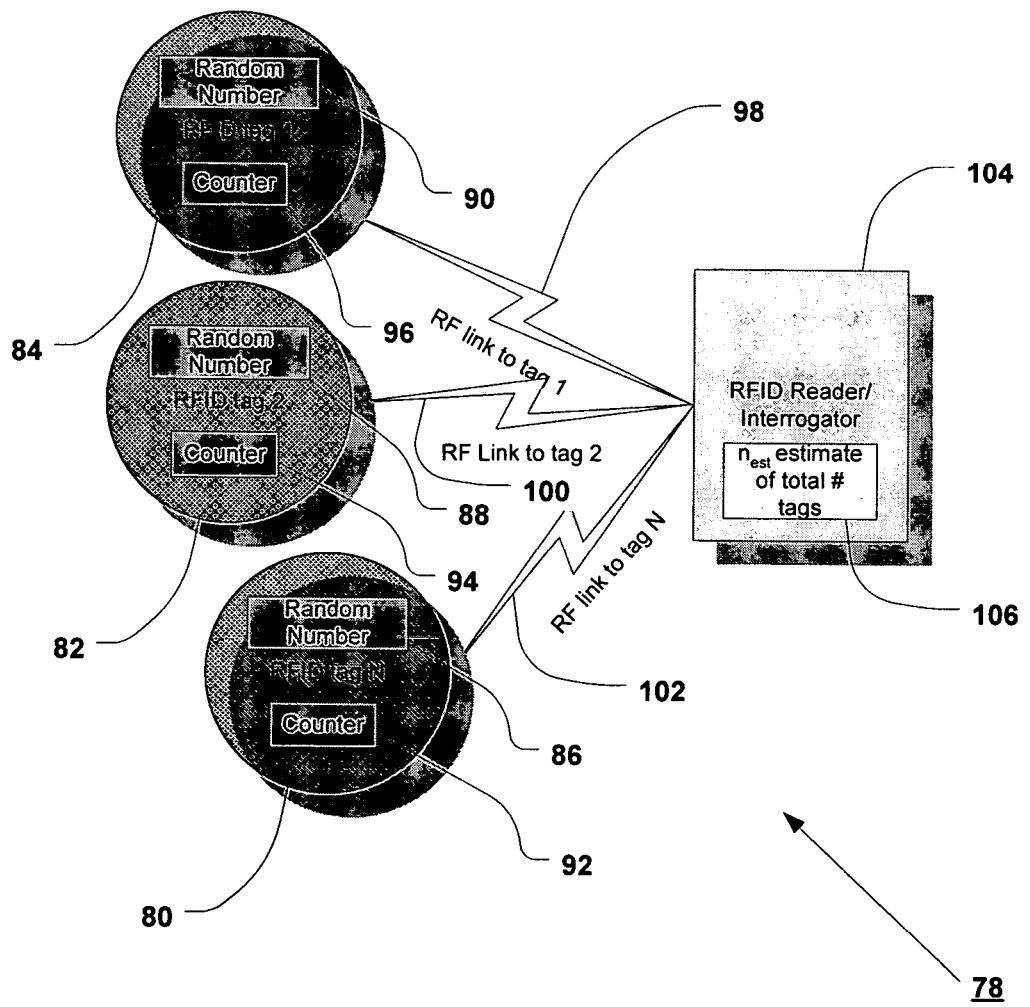
FIG. 5 is a block diagram of the slotted Aloha network used for an RFID tag system.
Figure 6:
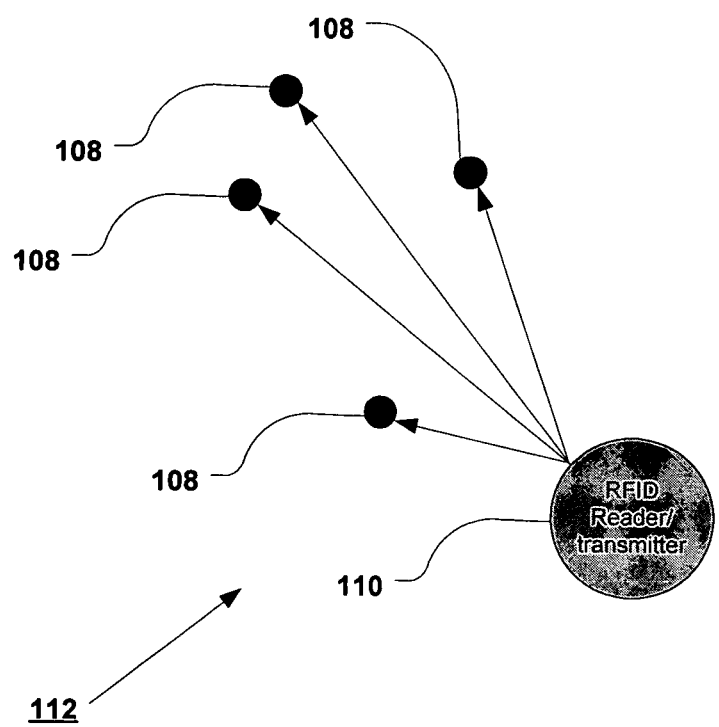
FIG. 6 is a block diagram of this process of creating random numbers using location.

FIG. 5 is a block diagram of a generalized Aloha RFID network 78, and FIG. 6 is a diagram 112 illustrating the use of location to obtain random numbers in the tags. Turning now to FIG. 5 where the controller 104 is the reader/interrogator that contains a number, $n_{est}$ 106 that is an estimate for the actual number of tags, N, in the network 78. The controller 104 communicates to the tags (84, 82, and 80) over RF communication links 98, 100, and 102 respectively. Each tag contains a random number that it created or acquired that is scaled to be a maximum of $n_{est}$ 106. Tag 84 has random number 90; tag 82 has random number 88, and tag 80 has random number 86. Each tag also has a counter (96, 94, 92 respectively for tags 84, 82, 80) that it uses to count the number of timeslots transmitted by the reader/interrogator 104 since initialization. Each counter contains the same information, hence the need for only one identifying number for the counter. When the reader/interrogator 104 sends a read command to the tags, each increment their counters (96, 94, 92) and compare the counter value against their random number (90; 88; and 86). If any of these numbers are equal to the counter (96, 94, 92) number, then the tag that contains that random number attempts to communicate. If more than one tag's random number (90; 88; and 86) contains the counter number (96, 94, 92), then they attempt to communicate simultaneously and a collision results. If none of the tags random number (90; 88; and 86) equals the counter (96, 94, 92) number then no tag attempts to communicate and an empty timeslot is the result.

The advantage of a slotted Aloha, is that individual communication packets are guaranteed not to overlap so only one timeslot needs to be reserved for each tag response. This results in greater throughput. The result is still a Poisson distribution, but it has a greater peak throughput than the pure Aloha.

Once again the graph of the throughput 74 for the slotted Aloha is shown in FIG. 4. Throughput is the number of tags per second (S 62) vs. the offered rate G 64. Observe how the peak throughput is now double the rate of the pure Aloha. This is a significant improvement, but is still shy of the maximum rate possible as determined by the communications link. If the maximum rate of the channel is 100 tags/second, the maximum possible throughout for the slotted Aloha is 36 tags/second and only occurs for a very particular value of G (G=1 for maximum throughput in a slotted Aloha). The reason the throughput remains low is that there is still a significant number of tags that result in collisions with other tags and another significant number that do not attempt to transmit during a particular timeslot because no particular tag has a random number that matches the number of that timeslot. This results in an empty timeslot, which wastes time. If a value of G 64 is picked to be something other than the optimum, then throughout decreases even more. To select an optimum value for G requires knowledge of the total number of tags in the tag field.

Figure 7:
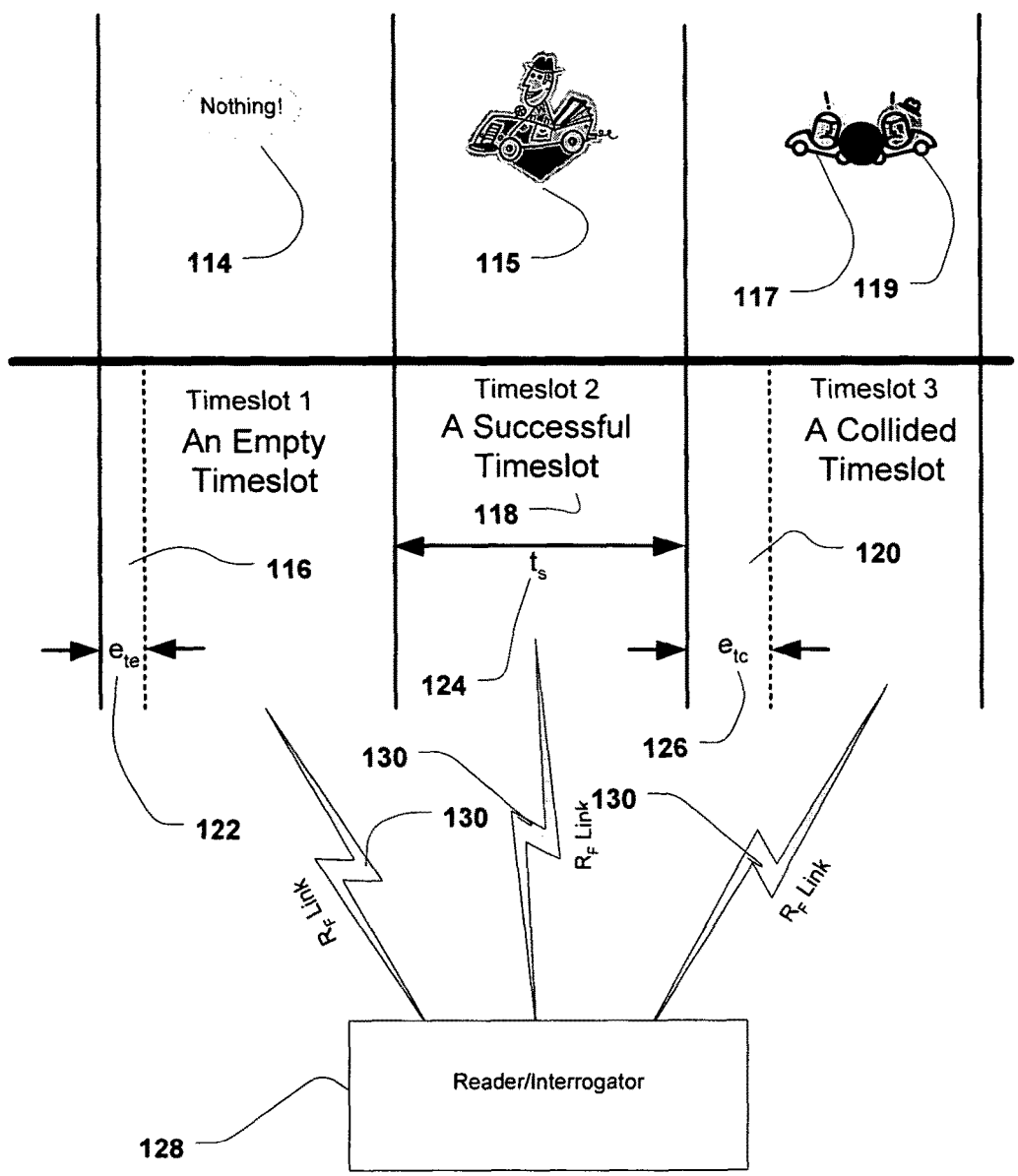
FIG. 7 shows the concept of the different kinds of timeslots.

What is needed is a way to move a raw tag field to a slotted Aloha, and provide a method to estimate with good accuracy the size of the tag field so that an optimum value for G 64 may be created. As shown in FIG. 7, the method will then need to provide a series of ways to shorten empty timeslots 116 and collided timeslots 120 so that even though these kinds of timeslots will continue to occur in the Slotted Aloha, their effect on throughput will be greatly reduced because of the reduction in time allowed for their occurrence and transmission. In particular, FIG. 7 shows the concept of the different kinds of timeslots using, by way of example, cars and drivers.

Referring to FIG. 7 the tags are represented by cars and drivers 115 with an empty timeslot 114 being empty; no car, no driver. Therefore, there will be no tags attempting to communicate during the timeslot having no car or driver. In the successful timeslot 118, there is one car and one driver 115 (tag). This car will get through because there is only one car and one driver. In the collided timeslot 120, there are two cars and drivers 117 and 118 (tags) attempting to drive on the one lane street. Consequently, there is a collision and neither car 117 or 118 (tag) gets through. FIG. 7 clearly shows the foreshortening of the empty timeslot to 122 and the collided timeslot to 126. The successful time slot $t_s$ 124 requires the most time; it requires the time needed to send all of the bits that need to be communicated from the tag to the reader/interrogator. The empty timeslot $e_{te}$ 122 requires the least amount of time because it is easy to recognize silence and there is no transmitting tag that has to turn off. Finally a collided timeslot requires a time that is somewhere between $t_s$ and $e_{te}$ and is shown to have a length of time $e_{tc}$ 126. The reader/interrogator 128 controls all of these times over RF links 130.

A method is disclosed for providing feed forward information such that the system runs as close to optimum, much of the time, without convergence issues, is created. A method is also disclosed for creating random numbers for tags based on location information of the individual tags is shown. This method makes sure that each tag has a unique random number that is different from all other tags random number. Other methods of producing unique random numbers can also be used and the selection thereof does limit the scope or intention of this invention. The generation of a unique random number prevents collisions and speeds the system up even more. Finally, it may be difficult to prove that all the tags from a tag field have been read. This invention provides a technique that guarantees all tags are read.

The result is a system that is capable of beginning with a raw and completely unknown set of tags and read them at a rate very close (within a few percent) of the maximum allowed by the communications channel itself with a very high degree of accuracy. The following description below develops the mathematical theory required to accomplish this.

The Poisson distribution function is:

$$P_k(t) = \frac{(\lambda t)^k}{k!} \varepsilon^{-\lambda t}$$

Where $\lambda$ is the mean (average) arrival rate in packets/second,
t is the time interval, and
k is the number of arrivals that occur during a time interval of t seconds (or m timeslots)
$P_k(t)$ is the probability that k arrivals occur during a time of t seconds (or m timeslots).
The probability that no packets arrive in the time interval t is $p_0$ $$p_0 = P_0(t) = \frac{(\lambda t)^k}{k!} \varepsilon^{-\lambda t} \bigg|_{k=0} = \frac{(\lambda t)^0}{0!} \varepsilon^{-\lambda t} = \varepsilon^{-\lambda t}$$

The probability that there will be exactly one arrival during the time t is $p_1$ $$p_1 = P_1(t) = \frac{(\lambda t)^k}{k!} \varepsilon^{-\lambda t} \bigg|_{k=1} = \frac{(\lambda t)^1}{1} \varepsilon^{-\lambda t} = (\lambda t)\varepsilon^{-\lambda t}$$

The probability that there will be two or more arrivals for the same time t is equal to $p_2$:

$$p_2 = \frac{(\lambda t)^k}{k!} \varepsilon^{-\lambda t} \bigg|_{k \geq 2} = \sum_{k=2}^{\infty} \frac{(\lambda t)^k}{k!} \varepsilon^{-\lambda t} = 1 - \varepsilon^{-\lambda t} - \lambda t \varepsilon^{-\lambda t}$$

In an Aloha system, $\lambda$ is the offered rate g or $g=\lambda$. Converting the time system from a seconds based system to one based on the packet length, $t_s$ the terms are now changed to tags/timeslot instead of tags/second. Define m to be an integer number of timeslots each of duration $t_s$. Let t in the above probability equations equal m. Making these substitutions:

$$\lambda t = gm$$

By normalizing the time to be one timeslot or m=1 this simplifies the above probability equations to:

$$p_0 = \varepsilon^{-g}$$

$$p_1 = P_1(t) = g\varepsilon^{-g}$$

$$p_2 = 1 - \varepsilon^{-g} - g\varepsilon^{-g}$$

Because $p_1$ is the probability that a timeslot is successful because it has only one tag contending for the timeslot, $p_1$ is equal to the actual throughput of the network, s normalized to 1.

$$s = p_1 = g\varepsilon^{-g}$$

Observe that multiplying $p_0$ by g also results in the normalized throughput s. Thus $$s = gp_0 = g\varepsilon^{-g}$$

By differentiating the equation s with respect to g and setting the result equal to zero, the optimum throughput as a function of g can be found. Doing this gives:

$$\frac{ds}{dg} = -g^2 \varepsilon^{-g} + \varepsilon^{-g} = 0$$

$$g^2 = 1$$

$$g = 1$$

This validates that the maximum throughput for a slotted Aloha network occurs when g=1.

By running the system for exactly $n_t$ timeslots and defining $n_x$ as the number of tags received during this time; $n_x$ is equal to the throughput s (in tags/timeslot) times $n_t$ (the number of timeslots) or:

$$n_x = sn_t = n_t g \varepsilon^{-g}$$

This can be solved for $n_t$:

$$n_t = \frac{n_x \varepsilon^g}{g}$$

For maximum throughput, g=1. Substituting for g says that for every tag in the tag field, 2.72 timeslots must be reserved for maximum throughput in a standard slotted Aloha system. Any more timeslots and throughput will fall because there will be too many empty timeslots. Any fewer timeslots and there will be too many collisions and once again, throughput will decrease.

The ratio of $p_1/p_0$ is:

$$\frac{p_1}{p_0} = \frac{g\varepsilon^{-g}}{\varepsilon^{-g}} = g$$

Defining $n_e$ as the number of empty timeslots that occur during the time $n_t$.

$$\frac{n_x}{n_e} = \frac{p_1}{p_0} = \frac{g\varepsilon^{-g}}{\varepsilon^{-g}} = g$$

Or $$n_e = \frac{n_x}{g} = n_t \varepsilon^{-g}$$

Or $$g = \frac{n_x}{n_e}$$

The above formulation allows an easy way to calculate g from measured data. Simply run the system for duration equal to $n_t$ timeslots and count the number of successfully received packets and the number of empty packets and divide. For a slotted Aloha network, the optimum throughput value for g is 1. This occurs when the number of successful timeslots $n_x$, is exactly equal to the number of empty timeslots $n_e$. Knowing g allows for the calculation of the exact number of tags in the tag field. It should be noted that the number of empty packets and the number of collided packets are not the same. Both result in no packet getting through, but the difference is determined from $n_e$, by listening for silence immediately after a read command. A collided packet is determined by actually receiving data, but determining that it is garbage by using error detecting codes such as a CRC code or other error detection scheme.

Next, define $n_c$ as the number of unsuccessful packet transmission because of collisions that occur during the time $n_t$. Ratio the probabilities $p_2/p_1$ to obtain:

$$\frac{p_2}{p_1} = \frac{1 - \varepsilon^{-g} - g\varepsilon^{-g}}{g\varepsilon^{-g}} = \frac{\varepsilon^g - g - 1}{g}$$

Now $$\frac{n_c}{n_x} = \frac{p_2}{p_1} = \frac{\varepsilon^g - g - 1}{g}$$

Or $$n_c = n_x \frac{\varepsilon^g - g - 1}{g} = \frac{n_t g \varepsilon^{-g}(\varepsilon^g - g - 1)}{g} = n_t \varepsilon^{-g}(\varepsilon^g - g - 1)$$

Or $$n_c = n_t(1 - \varepsilon^{-g}(1+g)) = n_t(1 - \varepsilon^{-g} - g\varepsilon^{-g})$$

Write $n_c$ in terms of $n_e$ by noting that $$\frac{n_c}{n_e} = \frac{n_t(1 - \varepsilon^{-g} - g\varepsilon^{-g})}{n_t \varepsilon^{-g}} = \frac{n_t}{n_e} - 1 - \frac{n_x}{n_e} = \varepsilon^g - 1 - g$$

Then $$n_c = n_t - n_e - n_x = n_e(\varepsilon^g - 1 - g)$$

In an M/M/1 queue (Poisson Arrivals/Poisson Service/1 Server) assume that packets arrive in the queue with a mean arrival time of rate $\lambda$ and they are processed (transmitted) at mean rate $\mu$. Stated another way, $\mu$ is the maximum channel capacity in packets/second. For the network to be stable $\mu > \lambda$. The traffic intensity is defined as $\rho$:

$$\rho = \frac{\lambda}{\mu}$$

$\rho$ must be less than 1 for the network to be stable. It follows that the probability of the queue being empty is $1-\rho$. The average number of packets in the system (in the queue and the one being serviced) is $\overline{N}$ where:

$$\overline{N} = \frac{\rho}{1 - \rho}$$

The mean waiting time $T_s$, which includes service time, may be found by dividing the average number of packets in the system by the mean arrival rate or:

$$T_s = \frac{\overline{N}}{\lambda} = \frac{\frac{\rho}{\lambda}}{1 - \rho} = \frac{\frac{1}{\mu}}{1 - \rho} = \frac{1}{\mu - \lambda}$$

The mean queuing time $T_w$ that a packet must wait before it begins its transmission is found by subtracting the average transmission time $$\frac{1}{\mu}$$

from the average waiting time:

$$T_w = \frac{1}{\mu(1 - \rho)} - \frac{1}{\mu} = \frac{1}{\mu(1 - \rho)} - \frac{(1 - \rho)}{\mu(1 - \rho)} = \frac{\rho}{\mu(1 - \rho)}$$

Now look at an M/D/1 queue (Poisson Arrivals/Deterministic Service/I Server) where every packet has a fixed length rather than being exponentially distributed. In this system, the average number of packets in the system is:

$$\overline{N} = \frac{\rho}{1 - \rho} - \frac{\rho^2}{2(1 - \rho)}$$

The average waiting time is:

$$T_w = \frac{\rho}{2\mu(1 - \rho)}$$

For the invention, the packet length is fixed. Define m as the packet length in time, e.g. the time required to transmit a packet. m is equal to:

$$m = \frac{1}{\mu}$$

Therefore $\rho$ equals:

$$\rho = m\lambda$$

When considering total channel activity, the newly generated and retransmitted packets together constitute a Poisson process with rate Λ, where rate Λ (packets/sec). Then the total offered load on the channel is g where g equals:

$$g = m\Lambda$$

For a Slotted Aloha network, the normalized throughput S, measured in tags/timeslot is:

$$S = g\varepsilon^{-g}$$

For a Slotted Aloha network running in a system where the time/timeslot is $t_s$, the normalized throughput $t_{ps}$, in tags/second is:

$$t_{ps} = \frac{S}{t_s} = \frac{g\varepsilon^{-g}}{t_s}$$

For a Pure Aloha network, the normalized throughput S, measured in tags/timeslot is:

$$S = g\varepsilon^{-2g}$$

For a pure Aloha network running in a system where the time/timeslot is $t_s$, the non-normalized throughput $t_{ps}$, in tags/second is:

$$t_{ps} = \frac{S}{t_s} = \frac{g\varepsilon^{-2g}}{t_s}$$

$n_x$ is the number of tags received during a time equal to $n_t$ timeslots. For the Slotted Aloha network (which unless otherwise noted will be the default from here on), is equal to $$n_x = n_t g\varepsilon^{-g}$$

or $$\frac{n_x}{n_t} = S = g\varepsilon^{-g}$$

$n_t$ is the total number of timeslots needed to read $n_x$ tags. Solving the previous equation for $n_t$ gives:

$$n_t = \frac{n_x \varepsilon^g}{g}$$

$n_e$ is the number of empty timeslots received during the time of $n_t$ timeslots required to read $n_x$ tags. It is equal to $$n_e = \frac{n_x}{g} = n_t \varepsilon^{-g}$$

Or $$g = \frac{n_x}{n_e} = \frac{g n_t \varepsilon^{-g}}{n_e}$$

Or $$\frac{n_e}{n_t} = \varepsilon^{-g}$$

$n_c$ is the number of corrupted timeslots due to collisions received during the time of $n_t$ timeslots required to read $n_x$ tags. It is equal to:

$$n_c = n_x \frac{\varepsilon^g - g - 1}{g} = n_t \varepsilon^{-g}(\varepsilon^g - g - 1)$$

Or $$n_c = n_e(\varepsilon^g - g - 1)$$

It is also equal to:

$$n_c = n_t - n_e - n_x = n_e(\varepsilon^g - 1 - g)$$

Given the above definitions, the following interesting ratios are derived:

$$\frac{n_c}{n_t} = \frac{n_x}{n_t} \frac{\varepsilon^g - g - 1}{g}$$

$$\frac{n_c}{n_t} = S \frac{\varepsilon^g - g - 1}{g}$$

$$\frac{n_c}{n_t} = 1 - \frac{n_e}{n_t} - \frac{n_x}{n_t}$$

$$\frac{n_c}{n_t} = 1 - \frac{S}{g} - S$$

$$\frac{n_c}{n_t} = S \frac{n_c}{n_x}$$

$$\frac{n_x}{n_c} = \frac{g}{\varepsilon^g - g - 1}$$

$$\frac{n_x}{n_c} = S \frac{n_t}{n_c}$$

$$\frac{n_x}{n_t} = S$$

$$\frac{n_e}{n_t} = \frac{S}{g}$$

$$\frac{n_x}{n_e} = g$$

$$\frac{n_e}{n_c} = \frac{1}{\varepsilon^g - g - 1}$$

Figure 12:
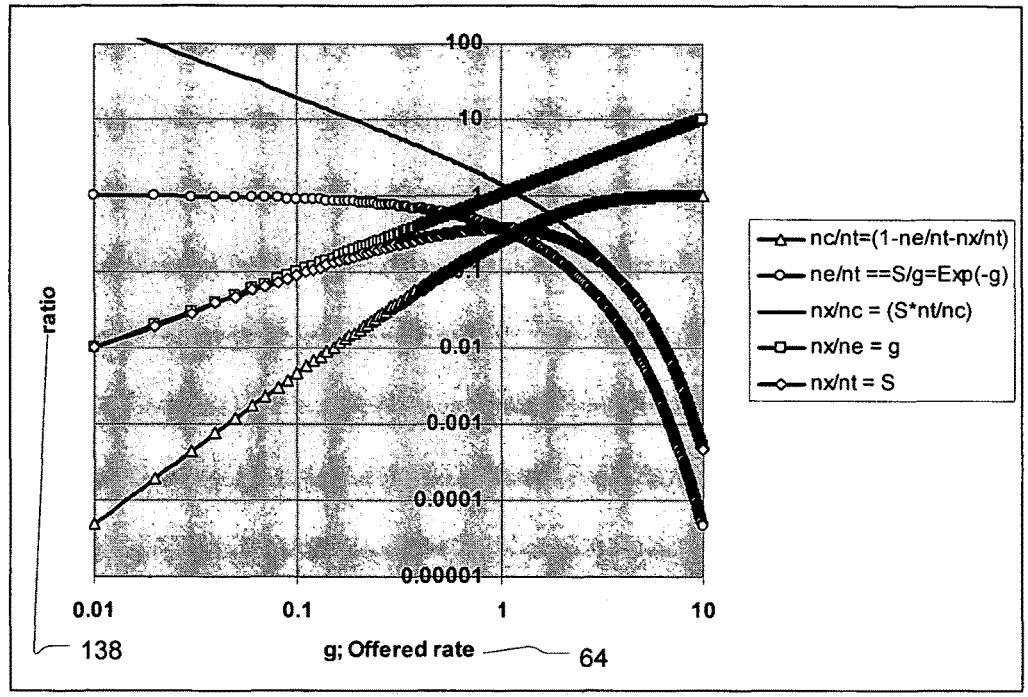
FIG. 12 graphically illustrates a comparison of the ratios $$\frac{n_c}{n_t}, \frac{n_e}{n_t}, \frac{n_x}{n_c}, \frac{n_x}{n_e},$$

FIG. 12 is a graph of the ratios 138:

$$\frac{n_c}{n_t} = 1 - \frac{n_e}{n_t} - \frac{n_x}{n_t}; \frac{n_e}{n_t} = \frac{S}{g} = \varepsilon^{-g};$$

$$\frac{n_x}{n_c} = S \frac{n_t}{n_c}; \frac{n_x}{n_e} = g;$$

and $$\frac{n_x}{n_t} = S$$

versus the offered rate g 64 and FIG. 13 is a graph of $n_t$, $n_e$, and $n_c$ 140 versus the offered rate g 64 for an $n_x$=1000 tags. Observe in this graph how the number of collisions and the number of timeslots climb dramatically for offered rates greater than 1. The two merge as g 64 becomes greater than 5. For g 64 less than 1, the number of collisions drops dramatically, while the number of timeslots, $n_t$, increases as g 64 gets smaller until it eventually becomes approximately equal to the number of empty timeslots at a g 64 of about 0.05.

In the figures, $t_s$ is length of the timeslot containing a successfully received tag information packet, $e_{tc}$ is the time required to determine that a timeslot has corrupted information due to collisions, $e_{te}$ is the time required to read an empty timeslot. These are the smallest times of $t_s$, $e_{te}$, and $e_{tc}$.

The ratio of $t_s$ to $e_{te}$ is $r_{see}$:

$$r_{see} = \frac{t_s}{e_{te}}, \text{ so } e_{te} = \frac{t_s}{r_{see}}$$

The ratio of $t_s$ to $e_{tc}$ is $r_{sec}$;

$$r_{sec} = \frac{t_s}{e_{tc}}, \text{ so } e_{tc} = \frac{t_s}{r_{sec}}$$

g is the offered rate to the network including new incoming packets and rejected packets due to collisions in units of tags/timeslot;

s is the output rate from the network in units of tags/timeslot; and $t_{tns}$ is the total time in seconds to read $n_x$ tags.

$t_{tnt}$ is the total time in timeslots to read $n_x$ tags $$t_{tnt} = n_t = \frac{n_x \varepsilon^{-g}}{g}$$

$t_{pt}$ is the rate of tags read in units of tags/timeslot and is equal to $$t_{pt} = \frac{n_x}{n_t}$$

$t_{ps}$ is the rate of tags read in units of tags/second and is equal to $$t_{ps} = \frac{n_x}{t_{tns}}$$

$r_{pt}$ is the number of timeslots/tag. It is the reciprocal of $t_{pt}$ $$r_{pt} = \frac{1}{t_{pt}}$$

$r_{ps}$ is the number of seconds/tag. It is the reciprocal of $t_{ps}$ $$r_{ps} = \frac{1}{t_{ps}}$$

$a_{tt}$ is the average time/timeslot in seconds while reading $n_x$ tags. It is equal to $$a_{tt} = \frac{t_{tns}}{n_t}$$

$S_{uf}$ is the speedup factor of the invention over that of a Slotted Aloha. It is equal to:

$$S_{uf} = \frac{t_{ps}|_{SlottedAloha}}{t_{ps}|_{Invention}} = \frac{t_s}{a_{tt}}$$

$n_{est}$ is the estimated number of tags in the tag field.

$n_{act}$ is the actual number of tags in the tag field.

$g_{act}$ is the actual value for g during a particular read cycle. It is equal to $$g_{act} = \frac{n_{act}}{n_{est}}$$

$g_{est}$ is the estimate value for g that the reader/interrogator uses to get a better estimate for $n_{act}$. $g_{est}$ is determined by the ratio $$g_{est} = \frac{n_x}{n_e}$$

Where $n_e$ is the number of empty timeslots read during the acquisition of $n_x$ successfully read tags. $g_{opt}$ is the optimal value for g to provide maximum throughput. It is equal to:

$$g_{opt} = 1 + ProductLog\left(\frac{e_{te} - e_{tc}}{\varepsilon e_{tc}}\right)$$

$r_n$ is a random number chosen by, or assigned to, the tags. $C_n$ is the output of each tag's counter that is compared against $r_n$ to determine if the tag should attempt to transmit.

It should be observed that the invention reduces time to acquire tags because it uses a different amount of time for the timeslot of an empty packet, vs. the timeslot of a collided packet, vs. the timeslot of a packet containing successfully communicated tag information. This has nothing to do with the number of timeslots needed. The number of timeslots needed total ($n_t$), successful ($n_x$), empty ($n_e$), or collided ($n_c$) remains the same as the slotted Aloha network. So all the equations for a Slotted Aloha hold in the 'timeslot domain'. The situation changes when in the 'seconds domain' where each variety of timeslot has a different actual time associated with it whereas the Aloha network has only one time associated with all varieties of timeslots $t_{tns}$ 134.

For the invention (and the most general form) $t_{tns}$ is equal to:

$$t_{tns} = n_x t_s + n_c e_{tc} + n_e e_{te}$$

For an Aloha network, $t_{tns}$ is equal to:

$$t_{tns} = n_x t_s + n_c t_s + n_e t_s = t_s(n_x + n_c + n_e) = t_s n_t$$

Substituting the previously rendered definitions and equations into the equation for $t_{tns}$ gives:

$$t_{tns} = n_x t_s + n_x\left(\frac{\varepsilon^g - g - 1}{g}\right)e_{tc} + \frac{n_x}{g}e_{et}$$

And substituting for $e_{te}$ and $e_{tc}$ gives $$t_{ms} = n_x t_s + n_x \left(\frac{\varepsilon^g - g - 1}{g}\right) \frac{t_s}{r_{sec}} + \frac{n_x}{g} \frac{t_s}{r_{see}}$$

Simplifying gives:

$$t_{ms} = n_x t_s \left(1 + \left(\frac{\varepsilon^g - g - 1}{g r_{sec}}\right) + \frac{1}{g r_{see}}\right)$$

Further simplification gives:

$$t_{ms} = \frac{n_x t_s (r_{sec} + r_{see}(-1 - g + \varepsilon^g) + g r_{sec} r_{see})}{g r_{sec} r_{see}}$$

Substitute for $r_{sec}$ and $r_{see}$ into $t_{ms}$ to give $$t_{ms} = n_x \left(t_s + e_{tc}\left(\frac{\varepsilon^g - g - 1}{g}\right) + \frac{e_{te}}{g}\right)$$

This simplifies to:

$$t_{ms} = \frac{n_x(e_{te} - e_{tc}(-1 + \varepsilon^g - g) + g t_s)}{g}$$

Figure 10:
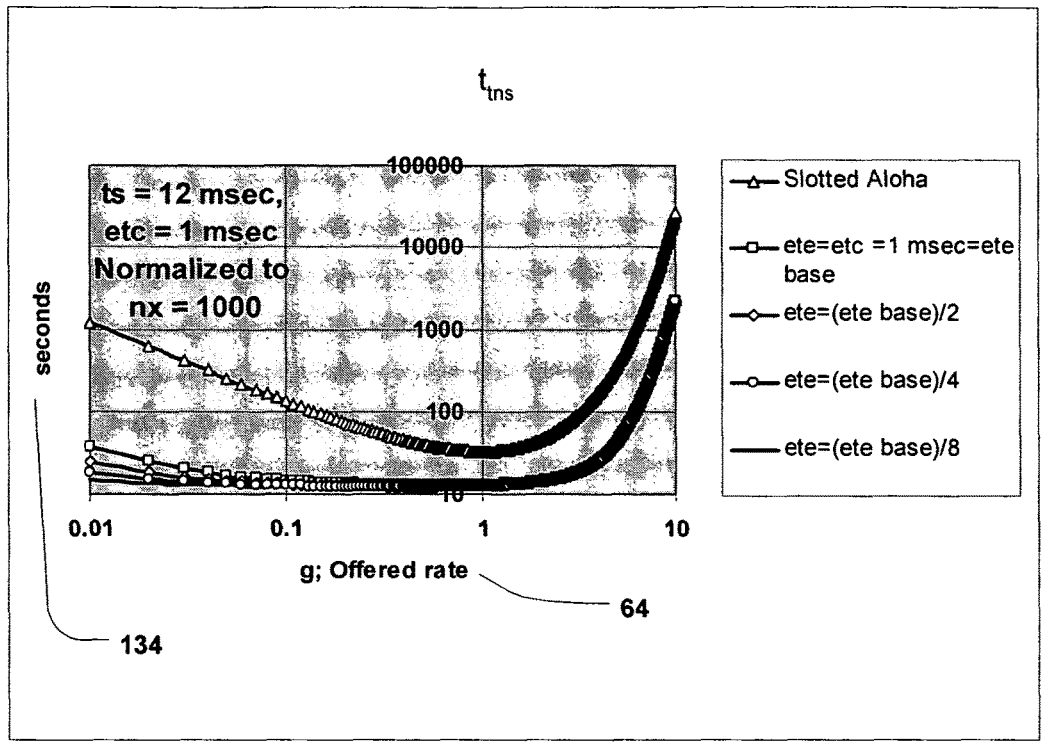
FIG. 10 graphically illustrates $t_{ms}$, the total time in seconds to read $n_x$ tags vs. the offered rate g.

A graph of $t_{ms}$ 134 vs offered rate g 64 is shown in FIG. 10 for $n_x$=1000 tags. In this graph, $t_s$ 124=12 ms; $e_{tc}$ 126=1 ms and $e_{te}$ 122 is a set of numbers; 1 ms; 0.5 ms; 0.25 ms; and 0.125 ms. The set of numbers for $e_{te}$ 122 were selected in order to illustrate concepts. These values will be used in future examples as well, unless otherwise noted. If the example required only one value for $e_{te}$ 122 then $e_{te}$ 122=0.25 ms unless otherwise noted. The final caveat is that all of the theoretically derived equations and the following figures assume that the starting value for the number of tags in the tag field is exactly equal to the actual number of tags in the tag field. When this is not the case, as will be seen later, these numbers will change; always for the worse.

Referring to FIG. 10, it is observed that the time 134 to read 1000 tags using the invention is approximately 12 seconds at optimum whereas the time 134 for the slotted Aloha is around 32.7 seconds. This makes the invention 2.72 times faster than the slotted Aloha when operated at the optimum value (g=1) of g 64 for the slotted Aloha. However, looking at the rest of the graph, the time 134 to read 1000 tags using the invention remains around 12 seconds from a g 64 of 0.1 to a g 64 of approximately 2. This is in contrast to the slotted Aloha that sees an increase in the time 134 to read 1000 tag of almost an order of magnitude between the two extremes for g 64. To make the slotted Aloha work as well as it does means that a very good estimate of the total number of tags in the tag field must be determined in order to make g optimum.

Figure 8:
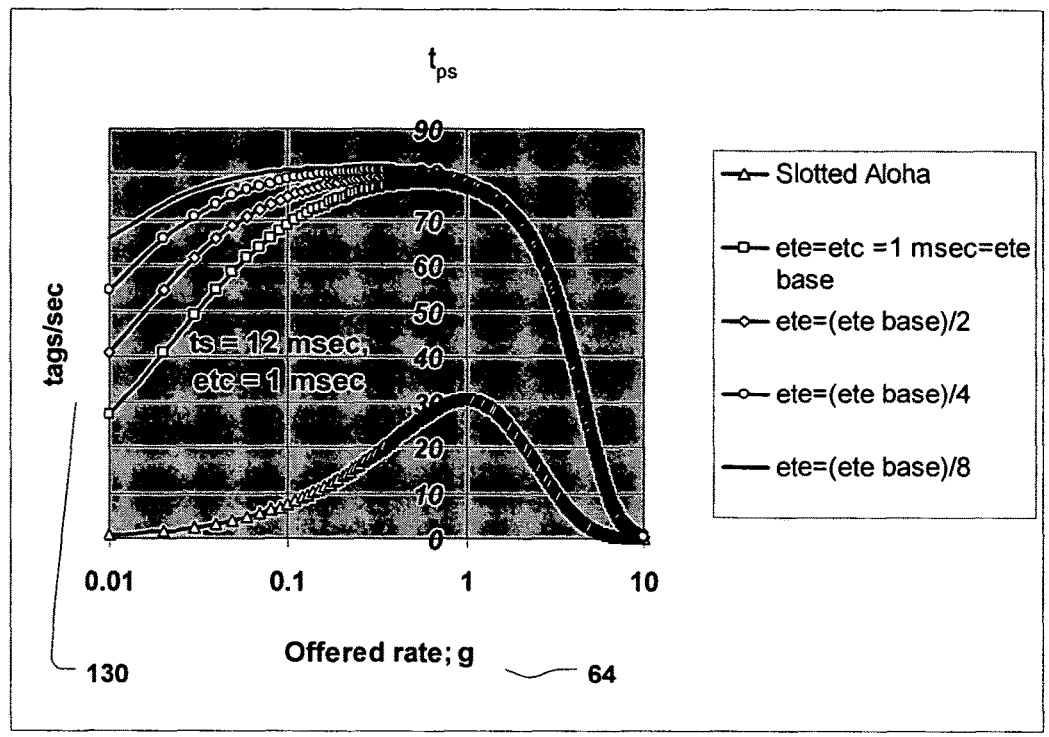
FIG. 8 graphically illustrates the normalized throughput $t_{ps}$, in tags/second vs. the offered rate g.

Making $t_{ps}$ the rate of successfully reading tags expressed in tags/second and recalling that $n_x$ is the number of successfully read tags, then $t_{ps}$ is:

$$t_{ps} = \frac{n_x}{t_{ms}} = \frac{g}{(e_{te} + e_{tc}(-1 + \varepsilon^g - g) + g t_s)};$$

also expressed in terms of $r_{sec}$ and $r_{see}$ as:

$$t_{ps} = \frac{g r_{sec} r_{see}}{t_s (r_{sec} + r_{see}(-1 + \varepsilon^g - g) + g r_{sec} r_{see})};$$

wherein a graph of $t_{ps}$ 130 vs. the offered rate g 64, is shown in FIG. 8.

In FIG. 8, it is clear that the throughput in tags/second 130 is substantially better for the invention over that of the slotted Aloha. If the system were perfect, the throughput would be equal to 1/0.012 tags/sec or 83.33 tags/second. Observe that the best the Aloha network can do when operated at it's optimum value for g 64 (g=1) is about 30.5 tags/second. In comparison, observe that the worst case $t_{ps}$ 130 for the invention is about 78 tags/second and best case is right at 80.5 tags/second. The latter is very close to the theoretical maximum of 83.33 tags per second allowed by the communications link. The other observation is how much the peak throughput has spread out over larger values of g 64. With $e_{te}$=1 ms, throughput never drops below 70 tags/sec from a value of g 64 of about 0.1 to a value of g 64 approaching 2 with a peak value of 78 tags/second. By contrast, the Aloha network has a peak value of only 30.5 tags second, and it drops by about 2/3 to around 8 tag/sec for the same range in g 64. Thus to achieve even the 30.5 tags per second, the Aloha network must have very accurate data about the number of tags in the tag field in order to set the value of g 64 correctly. On the other hand, the invention doesn't need anywhere near this accurate value for g 64 in order to provide the same result. But the invention also has an accurate way to obtain and control the value of g 64. Therefore, this graph indicates that the performance of the invention will always be substantially better than the Aloha network.

By making $t_{pt}$ the rate of successfully reading tags expressed in tags/timeslot and if $n_x$ is the number of successfully read tags, then $t_{pt}$ is:

$$t_{pt} = \frac{n_x}{n_e} = s = g\varepsilon^{-g}$$

Now look at the rate in timeslots/tag, $r_{pt}$, and the rate in seconds/tag $r_{ps}$. These are the reciprocals of $t_{pt}$ and $t_{ps}$ respectively. Therefore:

$$r_{pt} = \frac{1}{t_{pt}} = \frac{n_t}{n_x} = \frac{1}{s} = \frac{\varepsilon^g}{g};$$

And, $$r_{ps} = \frac{1}{t_{ps}} = \frac{e_{et} + e_{tc}(-1 + \varepsilon^g - g) + g t_s}{g} = t_s r_{pt}$$

$$r_{ps} = \frac{t_s(r_{sec} + r_{see}(-1 + \varepsilon^g - g) + g r_{sec} r_{see})}{g r_{sec} r_{see}} = t_s r_{pt}$$

Figure 9:
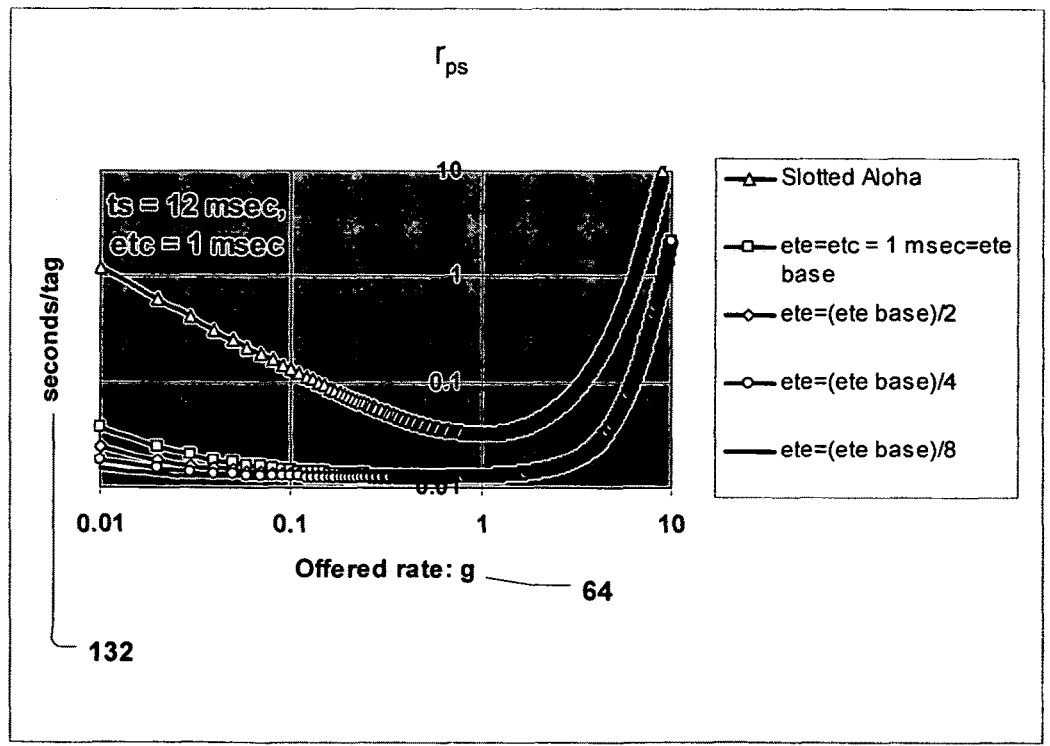
FIG. 9 graphically illustrates $r_{ps}$ the number of seconds/tag vs. the offered rate g.

A graph of $r_{ps}$ 132 is shown in FIG. 9. This graph shows much the same thing as the $t_{ps}$ 130 graph in FIG. 8, but it shows the broadness of the throughput vs. offered rate g 64 a little better. Notice how the invention's graph is virtually flat for g's 64 less than 1. It is also interesting to note that when g 64 becomes greater than 1, the curve turns upward sharply (though it remains much better than the Aloha network). This is because as the number of collisions increases, the throughput drops dramatically because there are so many collisions that virtually none of the tags can successfully communicate.

$a_{tt}$, the average time per timeslot in seconds while reading $n_x$ tags is equal to $t_{tns}/n_t$:

$$a_{tt} = \frac{t_{tns}}{n_t}$$

$$= \frac{\frac{n_x(e_{te} + e_{tc}(-1 + \varepsilon^g - g) + gt_s)}{g}}{\frac{n_x \varepsilon^g}{g}}$$

$$= \frac{(e_{te} + e_{tc}(-1 + \varepsilon^g - g) + gt_s)}{\varepsilon^g}$$

Simplifying gives:

$$a_n = e_{te}\varepsilon^{-g} + e_{tc}(1 - \varepsilon^{-g}(1+g)) + gt_s\varepsilon^{-g}$$

Substituting for $e_{te}$ and $e_{tc}$ gives:

$$a_{tt} = \frac{t_s\varepsilon^{-g}(r_{scc} + r_{see}(-1 - g + \varepsilon^g) + gr_{scc}r_{see})}{r_{scc}r_{see}}$$

$$= \frac{(r_{scc}\varepsilon^{-g} + r_{see}(-\varepsilon^{-g}(1+g) + 1) + g\varepsilon^{-g}r_{scc}r_{see})}{r_{scc}r_{see}}$$

Figure 11:
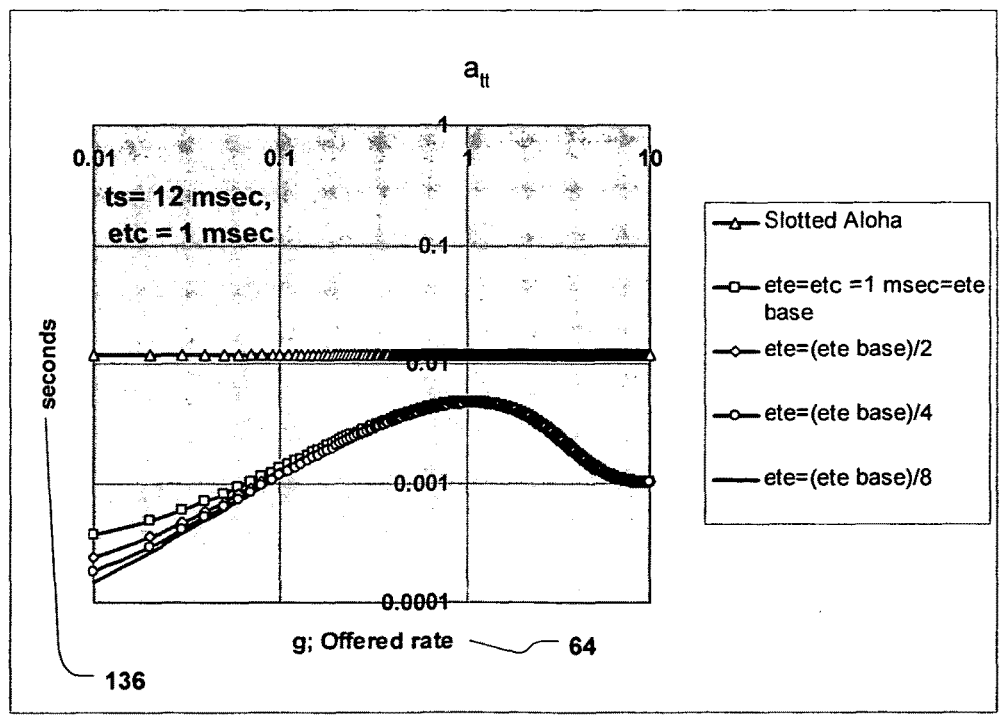
FIG. 11 graphically illustrates $a_{tt}$ the time/timeslot vs. the offered rate g.

A graph of $a_{tt}$ 136 vs. g 64 is shown in FIG. 11. The slotted Aloha always has an average time per timeslot equal to $t_s$ since all timeslots have the same value ($t_s$). The invention on the other hand actually has a peak value of $a_{tt}$ 136 occurring at g 64=1 because this is where the largest number successful tag reads are created. As g 64 gets greater or smaller than 1, the average time/timeslot goes down, because collided and empty timeslots require less time than a successful timeslot.

A figure of merit for the invention is the increase in throughput over that of a slotted Aloha. This Speed_Up_Factor or $S_{uf}$ can be expressed as:

$$S_{uf} = \frac{t_{ps}|_{SlottedAloha}}{t_{ps}|_{invention}} = \frac{t_s}{a_{tt}} = \frac{t_s\varepsilon^g}{(e_{te} + e_{tc}(-1 + \varepsilon^g - g) + gt_s)}$$

FIG. 15 shows speedup factor in throughput 144 for the invention over that of the slotted Aloha vs. the offered rate g 64. Observe that the speedup factor is least (and equal to 2.72) at an offered rate 64 of 1. This is because this is where the Slotted Aloha is most efficient. Moving away from a g 64 value of 1, the speedup factor goes up to between 10 and 500 over that of the Aloha (with this set of numbers for $t_s$, $e_{te}$, and $e_{tc}$). The reason is that either the number of empty timeslots increase as g gets smaller or the number of collisions gets greater as g 64 gets bigger. The Aloha network has no way to deal with this while the invention has a way to shorten both empty and collided timeslots so they have less effect (much less effect). At worst, the invention is 2.72 times faster, and that only occurs at the optimum value of g 64 for the Aloha network, g=1.

FIG. 14 is a graph of the time to read 142 $n_x$ tags vs. the offered rate g 64 when $n_x$=1000. The plots of $n_x$, $n_e$, $n_c$, and $n_t$ shown in FIG. 14 are aggregated to $n_t$, the total time to read 1000 tags. The time to read $n_x$ is a constant of 12 seconds because reading 1000 tags requires 1000 timeslots of 12 ms each. The time to read $n_e$ decreases as g 64 increases because the number of empty timeslots decreases. The time to read $n_c$ becomes larger as g 64 increases because the number of collisions increase in this direction. And $n_t$ increases dramatically as g 64 increases beyond a g 64 of 2 because there are so many collisions generated that they become the dominant factor.

If $e_{te}$ equals $e_{tc}$, then the maximum throughput ($t_{ps}$) always occurs at the offered rate of g=1. If $e_{te}$ is not equal to $e_{tc}$, then the maximum throughput occurs for a different value of g. To find this optimum point, take the derivative of $t_{ps}$ with respect to g; set it equal to zero and solve for g. Doing this gives:

$$\frac{dt_{ps}}{dg} = \frac{e_{te} - e_{tc}(-1 + \varepsilon^g(+1 - g))}{(e_{te} + e_{tc}(-1 + \varepsilon^g - g) + gt_s)^2} = 0$$

$$g_{opt} = 1 + ProductLog\left(\frac{e_{te} - e_{tc}}{\varepsilon e_{tc}}\right)$$

A graph of this function is shown in FIG. 21. Clearly, for all cases where $$\frac{e_{te}}{e_{tc}} \leq 1 \text{ then } g \leq 1;$$

there are any number of algorithms that may be used to implement the invention described earlier. However, they all require certain components based on the previously described theory. This section describes those components.

To begin, the reader/interrogator chooses a very large number for $n_{est}$, one that is likely to exceed the actual number of tags $n_{act}$, in the tag field. The reader/interrogator sends this value of $n_{est}$ to all the tags. Each tag will choose a random number $r_n$ (an integer) and use $n_{est}$ as a scaling factor by choosing the random number to be between 1 and $n_{est}$. An example of one way this could be done is to assume that the tags have a random number generator that produces a uniform distribution of numbers between 0 and 0.999999. Since the end scale is not to exceed $n_{est}$ and therefore the number 1, when the random number generator produces a 1 it won't be accepted 1 and the number generator produces a second result or a number different then 1. The tag takes the number produced by this random number process and multiplies its result by $n_{est}$ and then adds 1 to create a number between 1 and $n_{est}$+1. To get it to integer format, it truncates all decimal digits. For example, assume that the original value of $n_{est}$ was 8192. The reader/interrogator sends 8191 to the tags. Assume that one tag's random number generator generates a random number equal to 0.00000125. A second tag's random number generator generates 0.9 and a third tag's number generator generates 0.99999. When multiplied by 8192 these numbers become 0.01024, 7372.8, and 8191.999 respectively. Add 1 to each number and then truncate the decimal digits and you are left with the numbers 1, 7373, and 8192 respectively. All of the random numbers $r_n$ are now between 1 and 8192.

The invention contains another way to compute random number based on a tags geographic location. Because it is separate from the following discussion on determining tag field size, in order to avoid confusion, it will be discussed later.

Each tag has a counter that produces an output $c_n$. During the cycle initialization time, this counter is set to zero (this is the same time that the reader/interrogator transmits $n_{est}$ to the tags and the tags generate $r_n$). After this time, the reader/interrogator will begin the actual tag read cycle. When the reader/interrogator sends a read command, each tag increments its counter by 1 and compares $c_n$ against $r_n$ and if equal, attempts to communicate. If $c_n$ is not equal to $r_n$, it does nothing. If $c_n$ is equal to $r_n$ it attempts to communicate. If it receives an acknowledgement from the reader interrogator, indicating successful communication, it saves this knowledge in memory, and it does not attempt to communicate again until the reader/interrogator specifically tells the tag to do so.

It is important to note that there are two kinds of read commands coming from the reader/interrogator.
1. A read command that associates a not-acknowledge (NACK) indicating that the last read was unsuccessful in reading any tag data
2. A read command that associates an acknowledge (ACK) along with the successfully communicated tags ID number indicating that the last read was successful. This is what the tag uses to determine if it was successful in its transmission.

By having two different kinds of read commands that provide for read acknowledgement, time is not wasted on separate commands for ack and nak.

During the read cycle, the reader/interrogator will listen to the channel for activity. If it hears nothing for a period of time equal to $e_{te}$ after the beginning of the read cycle, it will conclude there are no tags attempting to communicate during this timeslot and it will transmit a new read command thereby truncating the timeslot early. There was no tag that had a random number assigned to this particular slot so none attempted to communicate. It counts this timeslot as in the $n_e$ column.

Another possibility is that the reader/interrogator hears activity, but the communication consists of corrupted bits. The corrupted bits are assumed to be the result of a collision between two or more tags (really, any transmission failure which results in a corrupted tag packet). Once again, the reader/interrogator sends a new read command after $e_{tc}$ and it adds one to the $n_c$ column. The collision detection process will likely take longer than the empty slot detection, process since the reader/interrogator must attempt to decode a number of data bits before it can unambiguously determine it is processing noise. It has to determine that the receive signal is correct or corrupted. Therefore the time for this kind of event $e_{tc}$ is likely to be longer than $e_{te}$, but should still be shorter than the time required performing a successful read $t_s$.

Most RFID tags do not have the ability to transmit and receive at the same time. Once it has begun to transmit, it is deaf to the reader/interrogator sending a new read command early. Of course, this latter problem could be dealt with by manufacturing an RFID tag that may receive a signal while transmitting at the same time. However, this may not be economical because of the additional RF circuitry required. To perform collision detection, any number of error detection schemes exist that may be used. These schemes are well known in digital communications theory. To work well, they require specially encoded information be transmitted. The only purpose of this specially coded information is for the detection of multiple tag transmissions by the reader/interrogator. The specially coded information may be the 10 bit CRC value for some portion of the tag data field, for example. If the upload bit rate from tag to reader/interrogator were 11 Kbits/sec (example only), and we assign 0.9 ms to transmit this specially coded information, $e_{tc}$ will be slightly longer than 0.9 ms. Now suppose that the tag does nothing after this transmission until it hears a reply from the reader/interrogator with a command that says, "continue" (or if the reader/interrogator detected a collision, and sends a new NACK-read command saying there was a collision). Usually the download speed from the reader/interrogator to the tags is much faster than the upload link because the signal to noise ratio is so large in this direction. Assume that download speed is 50 Kbits/second. Then if the "continue" command were 8 bits long, it would require 0.1 ms to download the command. The total round trip time is 1 ms (hence the 1 ms value for $e_{tc}$). The detection and use of that information to shut down the timeslot early or continue the transmission of the tags information may all be done in much less time than $t_s$ and in this example is done in about 1 ms (12 times faster than $t_s$).

FIG. 28 is a flowchart for this process. In FIG. 28 the left hand side is the tag process that begins with 218 while on the right hand side the reader/interrogator process that begins with process 234. The reader/interrogator process 234 begins by sending a read command to the tags. Any tag 218 whose random number matches its timeslot counter number ($c_n$) attempts to communicate by sending a short preamble word for purposes of error detection 220. The reader/interrogator listens for this response in 236. If the data is scrambled, then a collision occurred and the reader/interrogator sends a NACK read back to the tags in 240. If it is not scrambled and the preamble is good, it sends from 238 a continue command to the tags. The tag waits in 222 for a response, when it arrives, it looks to see in 224 if the response was a NACK read or a continue command. If it was a NACK read, it knows its data was scrambled and it waits until the next iteration before attempting to communicate again. If the response was a continue command, it sends the rest of the data from process 226. The reader/interrogator in 242 looks at the data sent by the tag and determines if it is okay. If so, it sends 246 an ACK read, if not it sends from 244 a NACK read command. In 228 the tag waits to see if it got a NACK read or an ACK read from the reader/interrogator. If it was successful (an ACK read), control flows to process 232 where it goes to sleep. If it wasn't successful (it got a NACK read), it goes to 230 and waits for the next iteration. Back on the reader side, flow goes from either 244 or 246 back to 236 where it waits for the results of the next read command. In 236, if a preamble was scrambled, it goes to 240 where it sends a NACK read command then goes to 236 where it waits for the result of the next tag transmission.

If a single tag successfully communicates its information to the reader/interrogator, the reader/interrogator adds one to $n_x$ and completes the reading of the tag information before sending a new read command. This process takes the longest time and is denoted as $t_s$.

A critical part of the invention is obtaining the best value of $n_{est}$ a necessary piece of information if the system is to be operated at it's optimum throughput point. To do this, the reader interrogator sends a stream of read commands. Because the original $n_{est}$ may be very high with respect to the actual number of tags in the tag field, the data rate of successfully received tags, $t_{ps}$ and $t_{tp}$ may be fairly low. The reader/interrogator runs through this read cycle until a "reasonable value" for $n_x$ is obtained (50 to 100 is a good number) wherein this number will be defined to be $n_{xmin}$. While doing this, it keeps track of the total number of timeslots used (truncated or not) the number of empty timeslots, $n_e$, and the number of collided timeslots, $n_c$.

To see what a reasonable value for $n_{xmin}$ might be, refer to FIGS. 22 and 23. These are graphs depicting the results of simulations for various values of $n_{xmin}$ vs. the ratio of the original estimate for the total number of tags $n_{est}$ and the actual number of tags in the tag field $n_{act}$. A total of thirty simulations were run. FIG. 22 shows the average error in the estimate of the total number of tags vs. $n_{xmin}$, while FIG. 23 shows the actual estimate of the total number of tags vs $n_{xmin}$ sample values of 10, 20, 50, and 100 samples. This is a scatter chart illustrating the degree of variation around each of the values. The estimates at the low end (number of samples, $n_{xmin}$=10) range from a low of around 400 to a little over 2700 (the correct value is 1024). At $n_{xmin}$=50 samples, the estimates range from a low of about 750 to a high of about 1500, and if 100 samples are used, the estimates range from a low of about 750 to a high of 1250. From these charts it is obvious that the more samples, the less the error. It is also clear that the ratio of $n_{est}/n_{act}$ affects the accuracy of the final estimate with an optimum being at an offered rate of 0.25.

Referring to FIG. 22, when the ratio is $n_{est}/n_{act}$=8192/1024=8, (g=0.125), the error at 50 samples is about 12.5%. The error at 100 samples is 7.5% (and the error at 20 samples is 23%). It is clear that at around 50 samples, the error is beginning to flatten out. Of course 100 samples would be better. Going any lower than 50 samples raises the risk of large errors due to statistical variation as seen in FIG. 23. It is always better to run larger samples for accuracy purposes. If the wrong estimate is used, the result is not disaster, the system will correct itself eventually; it just may take a little time. So this issue is more one of optimization. The final values will depend on any number of system issues including the values of $e_{te}$, $e_{tc}$, and $t_s$.

FIG. 24 is a flowchart of this process to estimate the tag size. In FIG. 24, process 148 is the entry point process and performs the role of initialization. All of the variables used in the process are initialized to their appropriate values. Here is where the original large estimate for the number of tags in the tag field $n_{est}$ is set. If a value for $g_{opt}$ has not already been determined, it will be done here using the equation:

$$g_{opt} = 1 + ProductLog\left(\frac{e_{te} - e_{tc}}{\varepsilon e_{tc}}\right)$$

$n_{est}$ is sent to the tags in the tag field so that they can do their random number generation and scaling.

Process 150 is the beginning of the read cycle where the first read command is sent to the tags. In conditional process 152, the reader/interrogator listens for a time $e_{te}$ for anything but silence. If only silence is heard during this time, the reader/interrogator determines that there are no tags contending for this timeslot. It then moves to process 156 where it adds one to the number of empty timeslots received ($n_e$) and it adds 1 to the variable $n_t$ that keeps track of the total number of timeslots used. It then sends NACK read command to the tag field telling them that no tags were read, and that they should increment their counters value $c_n$; compare their $c_n$ against their random number $r_n$ and if equal attempt to communicate their information. In other words, try again with a new read cycle. Flow from this point is back to the conditional process 152 so that the read process loop can continue.

If something was heard during the conditional process 152, then the reader/interrogator has a time of $e_{tc}$ seconds to determine if what's heard is valid data or if its noise generated by collisions. In conditional process 154 the determination is made that the signal is either valid or is invalid due to a collision of one or more tags. If it is valid, the read process continues until the tags information is completely read in process 160. In 160 the tags information is stored and the variable $n_x$ representing how many tags have been read is incremented by 1. The variable representing how many timeslots have been used ($n_t$) is also incremented by 1. In conditional process 162, $n_x$ is compared against the value for $n_{xmin}$. $n_{xmin}$ is the number of samples desired (the previously discussed 50 to 100 samples) to calculate a much better estimate for $n_{act}$ than what was used previously. If $n_x$ is less than $n_{min}$, flow goes to process 164 where an ACK read is sent to the tags. This command tells the tags that the last read was successful (so that the tag that sent the information is aware that its transmission was successful putting it into a state where it won't respond again until told to do so by the reader/interrogator). It also tells the rest of the tags to advance their counters, do the comparisons of $c_n$ against $r_n$ and begin a new read cycle.

Going back to conditional process 154, if the result of the comparison is that a collision was heard, the flow continues to process 158 where the variable $n_c$ that keeps track of how many collision occurred is incremented by 1. The variable $n_t$ (keeping track of the total number of timeslots used) is also incremented by 1. A NACK read command is sent to the tag field telling the tags that were attempting to communicate that they were not successful. It also tells the tags to increment their counters by one, and begin the read process again with a new timeslot. Flow from process 158 is back to the conditional process 152 so that the read process loop can continue. Going back to conditional process 162, if $n_x \geq n_{xmin}$ (the desired sample size) then flow goes to process 168. In process 168 an acknowledge command is sent to the tags so that the last tag read knows that it was read successfully. However, a new read cycle is not started. Instead, a new value for the total size of the tag field is calculated by first calculating a value for $g_{est}$ using the data just acquired:

$$g_{est} = \frac{n_x}{n_e}$$

The offered rate $g_{est}$ is equal to the actual number of tags in the tag field divided by the estimated number of tags in the field or:

$$g_{est} = \frac{n_{act}}{n_{est}} = \frac{n_x}{n_e}$$

After $g_{est}$ is calculated, flow goes to process 166 where a new value is calculated for $n_{est}$, the estimate of the number of tags in the tag field.

$$n_{act} = \left(\frac{n_x}{n_e}n_{est\_old} - n_x\right) = (g_{est}n_{est} - n_x)$$

The original estimate value was $n_{est}$ (and for all the examples in this document is equal to 8192). Obtaining $g_{est}$ using the data for $n_e$ and $n_x$ just measured, the above equation yields a new (presumably more accurate) value for the number of tags in the tag field. Observe that the number of tags successfully received ($n_x$) was subtracted out during the last cycle since they are no longer members of the unread number of tags in the tag field. This process then sets the variable $n_{est\_new}$ equal to the just calculated value for $n_{act}$, or:

$$n_{est\_new} = \left(\frac{n_x}{n_e} n_{est\_old} - n_x\right) = (g_{est} n_{est\_old} - n_x)$$

From here, flow goes to process 170 where the optimum value for $n_{est}$ is calculated using the relationship:

$$n_{est\_opt} = \frac{n_{est\_new}}{g_{opt}}$$

Where $g_{opt}$ (which need only be computed once for any system) is equal:

$$g_{opt} = 1 + ProductLog\left(\frac{e_{te} - e_{tc}}{\varepsilon e_{tc}}\right)$$

In future read cycles, $n_{est\_opt}$ will become the new estimate for the number of unread tags remaining in the tag field. The value $n_{est\_opt}$ then gets sent to the tags for their creation and scaling of random numbers.

From process 170 flow goes to process 172 where the variables that keep track of the total number of tags received, the total number of empty timeslots, the total number of collided timeslots and the total number of timeslots used during the entire process is kept; $n_x$, $N_e$, $N_c$, and $N_t$ respectively. The temporary variables $n_x$, $n_e$, $n_c$, and $n_t$ are reset for later use. The flow then moves to process 174, indicating that the process for initially estimating the sizes of the tag field is complete and the system is now ready for the next phase. It is important to have a process that gives a certain indication that all the tags in the tag field have been read. Because of the statistical nature of the problem, the equations generated, only yield estimates of $n_{act}$, the total tag field size.

In the foregoing, the original estimate for the number of tags in the tag field is always set to a number expected to comfortably exceed the actual $n_{act}$. There are two reasons for this. First, a low guess places the system on the unstable side of the Aloha network curve, and few, if any tags get read successfully. The second reason is that, with the disclosed technique of timeslot shortening, large tag fields are typically read nearly as fast as when $n_{est} = n_{act}$.

Sometimes, it is desirable to begin with an original estimate that is very small. This may be an advantage where the number of tags in a tag field may be very small on average with only a few instances of large numbers of tags populating the tag field. For example, in a grocery store, the general scanners might very well have thousands of tags within their tag field, but an individual basket of groceries being brought to the counter may have only a few items in it for. It is desirable to scan these items as quickly as possible so the customer can get checked out.

Using the grocery cart example, suppose that the actual number of items is 10 in the grocery cart. Further suppose that the initial estimate $n_{est}$ is 1; only one tag within the tag field. When a read is done under this assumption, all tags are going to collide and nothing will be read. On the other hand, if there really were only one item in the basket, a successful read would occur, completing the read cycle. After receiving a collision, $n_{est}$ is doubled, and another read attempt is made. This process is continued every time a collision occurs, until either an empty timeslot is detected, or a packet is read successfully. A series of reads are then performed until $n_x$ successful reads are achieved, or until all timeslots return empty. If $n_{xmin}$ is reached, the previously developed algorithm for determining a good estimate for the size of the tag field is used to produce future estimates of $n_{act}$. If all the timeslots are returning empty, the process moves to the finishing stage, described below and illustrated in FIG. 25. Basically, set $n_{est}$ to a 1 value and see if there are any responses other than empty timeslots.

As shown above, using an initial estimate larger than 1 may produce better results, since the shortening of empty timeslots ameliorates the effects of a large initial guess. For example, throughout this document, it has been assumed that it takes 12 ms to successfully read a single tag, but if the timeslot is empty, this timeslot will be shortened to 0.25 ms.

Suppose that the shopper only had 1 item in his cart, and the original estimate was 64 items. Then the total time to read that item would be 27.75 ms; a time so short that it would not be noticed in this situation. In the event of collisions, $n_{est}$ can be increased.

To determine if the last tag has been read, apply the method shown in FIG. 25. If all of the read commands in the cycle return an $n_c$ of zero; an $n_x$ of zero, and an $n_e > 0$, then there are no remaining tags in the field. This has to be true because if there was a collision there would have to be at least two tags remaining. If $n_x$ is non-zero, additional reads may be necessary. If $n_e$ is >zero, any remaining tags would have attempted to respond if they hadn't been read. Since, there were none read, and there were no collisions, the field must be empty of non-read tags.

The most time effective way to determine if the last tag in the tag field has been read (and the best way to see what is happening) is to set the tag size field estimate $n_{est}$ to 1 ($n_{est}=1$) and send it to the tag field. Each unread tag will create a random number and try to scale it between 1 and $n_{est}$; that is to say between 1 and 1. The reader/interrogator then attempts to read this one timeslot. If there is only one tag remaining, it will read this tag. If there is more than one remaining, collisions will result and $n_c$ will not be zero. If there are no remaining un-read tags in the tag field, then both $n_x$ and $n_c$ will be zero and $n_e$ will be one.

There are a number of similar techniques that can be used to implement the previous theory to read all of the tags in the tag field in the least amount of time. This section discusses one such technique. We assume that $t_s=12$ ms, $e_{tc}=1$ ms, and $e_{te}=0.25$ ms 1. Begin by using the previously defined algorithm to determine an approximate size of the tag field. Assume that this number is 1000.
2. Compute the optimum value for g (which equals 0.58 for the above values of $t_s$, $e_{tc}$, and $e_{te}$) using:

$$g_{opt} = 1 + ProductLog\left(\frac{e_{te} - e_{tc}}{\varepsilon e_{tc}}\right)$$

3. From the estimating size algorithm, we know that the approximate size of the tag field is 1000 tags. For maximum throughput, g needs to be equal to $g_{opt}$ which is equal to 0.58. To make this happen, it is necessary to increase the estimate for $n_{est}$ that gets sent to the tags so that they might create a large enough number of timeslots. This means that the value for $n_{est}$ is now equal to $n_{est\_opt}$ and $n_{est\_opt}$ is the number that gets sent to the tags. $n_{est\_opt}$ is equal to:

$$n_{est\_opt} = \frac{n_{est}}{g_{opt}} = \frac{1000}{0.58} = 1724$$

4. For this technique, the tags use the same algorithm used in the tag estimate algorithm; namely: Each tag has on board a counter that produces an output $c_n$. During the cycle initialization time, this counter is set to zero (this is the same time that the reader/interrogator transmits $n_{est}$ to the tags and the tags generate $r_n$). After this time, the reader/interrogator will begin the actual tag read cycle. When the reader/interrogator sends a read command, each tag advances its counter by 1 and compares $c_n$ against $r_n$, and if equal, attempts to communicate. If it is not equal, it does nothing. If $c_n$ is equal to $r_n$ it attempts to communicate. If it does succeed in communicating its information (because it receives an acknowledgement from the reader interrogator), it saves this knowledge in memory, and it does not attempt to communicate again until the reader/interrogator specifically tells the tag to do so. If it does not succeed in communicating its data, it does not attempt to do so again until the next iteration defined by the reader/interrogator.
5. Begin a new set of read cycles by sending to the tags a new estimate of tag field size $n_{est\_opt}$. Each tag re-computes its random number $r_n$, now scaled between 1 and $n_{est\_opt}$, 1724 in the present example. Each tag also resets its counter so that $c_n$ on all tags is zero. The reader then sends the first of a string of read commands to the tags, beginning the actual read process.
6. Assuming that the estimate for tags was reasonably close (thereby making $g_{est}$ very close to $g_{opt}$), the reader/interrogator continues to read tags until it has read $n_{est\_opt}=1724$ timeslots. At the end of this time, if the estimates were correct, it should have read:

$n_x = n_t g \varepsilon^{-g} = (1724)(0.58)\varepsilon^{-0.58} = 560$ successfully read tags $$n_e = \frac{n_x}{g} = \frac{560}{0.58} = 966 \text{ empty timeslots}$$

$n_c = n_t - n_x - n_e = 1724 - 560 - 966 = 198$ timeslots two or more tags colliding The remaining number of tags not yet read is $n_{rem}$ $n_{rem} = n_{est} - n_x = 1000 - 560 = 440$ The time to complete this particular read cycle would be:

$t_{ms} = n_x t_s + n_c e_{tc} + n_e e_{te} = 560*0.012 + 198*0.001 + 966*0.00025 = 7.16$ sec 7. What the system actually does at the end of this time is use the accumulated values for $n_x$, $n_e$, and $n_t$ to re-compute $g_{est}$. To do this it uses the equation $$\frac{n_x}{n_e} = g_{est}$$

to compute $g_{est}$. It then assumes that there was no error in the system (highly unlikely given the statistical nature of the problem but a good assumption to show how the system works) and computes a new value for $n_{act}$ based on the number $n_x$, $n_e$, and $n_{est}$. Doing this gives:

$$n_{act} = \frac{n_x}{n_e} n_{est}$$
$$= g_{est} n_{est\_opt}$$
$$= \frac{560}{966} 1724$$
$$= 0.58 * 1724$$
$$= 1000$$

This is equal to the $n_{est}$ value calculated earlier of 1000. To obtain the remaining number of tags present in the tag field, subtract from $n_{act}$ the just received value for $n_x$. This gives a new value for $n_{est}$ of:

$n_{est\_new} = n_{act} - n_x = 1000 - 560 = 440$

For this example, this value is the same as $n_{rem}$ calculated above. In practice, because of statistical variations, it $n_x/n_e$ would differ from the actual value of $g_{est}$ used to collect the data. Convergence is obtained even with large statistical variations. This example is for purposes of showing how the algorithm works and is not intended to show real data.

8. Now the system uses these numbers to compute a new value for $n_{est\_opt}$ to send to the tags so that the process may begin again. Remember g should be equal to $g_{opt}$ so the following equation is used:

$$n_{est\_opt} = \frac{n_{est}}{g_{opt}} = \frac{440}{0.58} = 759$$

The reader/interrogator sends this new value for $n_{est\_opt}$ (the next integer value is 759) to the remaining tags in the tag field. The tags use the number to re-compute their random number $r_n$ scaling it such that $r_n$ is between 1 and 759. Each tag resets it counter so that each $c_n$ is zero. The process then begins anew with the reader/interrogator beginning a new set of read commands. (Tags that were in collision during the last iteration now have another shot at communication).

9. As the process continues, the number of remaining tags gets smaller with each iteration. At some point, the amount of statistical variation becomes great enough that calculations fail because $n_e$ or $n_x$ went to zero: producing zero or ∞ for g. At this time, the technique traps on these values and asserts a remaining number for $n_{est}$ that is guaranteed to be large enough to read the remaining tags. The amount of extra time required for this last read cycle is very small when the whole process is considered. Values for this remaining number of tags, $n_{est}$, range from 20 to 50 and depend on the value of g selected. If the number is too small, it will simply require a few more iterations to complete the process.

10. At the end of each iteration, using the previously developed technique, check to determine if there are any remaining tags by setting the tag size field estimate $n_{est}$ to 1 ($n_{est}=1$) and send it to the tag field. Perform one read command. Each unread tag will create a random number and try to scale it between 1 and $n_{est}$; that is to say 1 and 1. The reader/interrogator then attempts to read this one timeslot. If there is only one tag remaining, it will read this tag. If there is more than one remaining, collisions will result and $n_c$ will not be zero. If there are no remaining un-read tags in the tag field, then both $n_x$ and $n_c$ will be zero and $n_e$ will be one. If there are remaining tags present after this test, then proceed to step 11. If not, you are done.

11. This entire process continues until all the tags are read. Table 1 shows this process taken through all of its iterations. This table (and the next) is an actual simulation of the process; it is not calculated from theoretical equations. It takes a total of 9 iterations to get all 1000 tags. Observe that a majority of tags are grabbed within the first four iterations; 718 tags are received during this time.

Table 2 shows the time to acquire tags using the above process compared against a Slotted Aloha network. It is broken down into time to acquire the actual tags, the time spent reading empty timeslots, and the time spent reading collided timeslots and the total time. The assumed times are $e_{te}=0.00025$ sec, $e_{tc}=0.001$ seconds, and $t_s=0.012$ seconds. One source of difference between the invention times and the Aloha times is that for the Aloha network all timeslots are equal to 0.012 seconds. A second difference between the invention and the Aloha system is in the use of the optimum value for g, given shortened empty and collided timeslots.

Observe that the invention acquires all 1000 tags in 12.52 seconds vs. a time of 38.65 seconds for the slotted Aloha (using the example numbers); an improvement of 3.07 in throughput. Of course, this network is running at the optimum point for maximum throughput. The ability to do so is a major feature of the invention. If the system were not operating at optimum, the improvement in speed over the Aloha network increases dramatically; potentially hundreds of times faster. This is because empty or collided timeslots increase very fast when g moves off of the optimum point. The invention makes these timeslots shorter in time while they remain the same in the Slotted Aloha network. Please note that the table 2 is actual simulation data; not data from theoretical equations. As such, running a second simulation could produce slightly different results due to statistical variation.

The equations derived for predicting time provide the same (approximate) answer as above. Namely:

$$t_{ms} = 1000\left(.012 + .001\left(\frac{\varepsilon^{.58} - .58 - 1}{.58}\right) + \frac{.00025}{.58}\right)$$
$$= 12.833 \text{ seconds}$$

This value is slightly longer than the simulation data. The difference is due to statistical variation. Throughput is given by:

$$t_{ps} = \frac{n_x}{t_{ms}}$$
$$= \frac{g}{(e_{te} + e_{tc}(-1 + \varepsilon^g - g) + gt_s)}$$
$$= \frac{1000}{12.52}$$
$$= 79.87 \text{ tags/sec}$$

By comparison, it took the Slotted Aloha network 38.65 seconds to read the same number of tags for a throughput of $$SlottedAlohaThroughput = \frac{1000}{38.65} = 25.87 \text{ tags/sec}$$

TABLE 1

The process above with the example of 1000 tags in the tag field, $e_{te}$ = 0.25 ms, $et_c$ = 1.0 ms, $t_s$ = 12 ms, $g_{opt}$ = 0.58. This is actual simulation data and is not derived from theoretical equations.

| Iteration | Nc | Ne | Nx | nt | gest (After Iteration) | Est_Remain | Actual Remaining | Nest_opt |
|---|---|---|---|---|---|---|---|---|
| 1 | 175 | 1026 | 523 | 1724 | 0.51 | 356.00 | 477.00 | 614.00 |
| 2 | 84 | 335 | 195 | 614 | 0.58 | 162.00 | 282.00 | 279.00 |
| 3 | 78 | 105 | 96 | 279 | 0.91 | 159.00 | 186.00 | 274.00 |
| 4 | 29 | 146 | 99 | 274 | 0.68 | 87.00 | 87.00 | 150.00 |
| 5 | 11 | 87 | 52 | 150 | 0.60 | 38.00 | 35.00 | 66.00 |
| 6 | 7 | 44 | 15 | 66 | 0.34 | 8.00 | 20.00 | 14.00 |
| 7 | 6 | 4 | 4 | 14 | 1.00 | 10.00 | 16.00 | 17.00 |
| 8 | 24 | 59 | 16 | 99 | 0.27 | 11.00 | 0.00 | 19.00 |
| 9 | 0 | 1 | 0 | 1 | 0.00 | 0.00 | 0.00 | 0.00 |
| Total | 414 | 1807 | 1000 | 3221 | | | | |

TABLE 2

Time to acquire tags using the above process compared against a Slotted Aloha network. This is actual simulation data and is not derived from theoretical equations.

| Iteration | Nc | Ne | Nx | nt | Tags (seconds) | Empty seconds | Collisions seconds | Total time | Slotted Aloha Seconds |
|---|---|---|---|---|---|---|---|---|---|
| 1 | 175 | 1026 | 523 | 1724 | 6.28 | 0.04 | 0.18 | 6.49 | 20.69 |
| 2 | 84 | 335 | 195 | 614 | 2.34 | 0.02 | 0.08 | 2.45 | 7.37 |
| 3 | 78 | 105 | 96 | 279 | 1.15 | 0.02 | 0.08 | 1.25 | 3.35 |
| 4 | 29 | 146 | 99 | 274 | 1.19 | 0.01 | 0.03 | 1.22 | 3.29 |
| 5 | 11 | 87 | 52 | 150 | 0.62 | 0.00 | 0.01 | 0.64 | 1.80 |
| 6 | 7 | 44 | 15 | 66 | 0.18 | 0.00 | 0.01 | 0.19 | 0.79 |
| 7 | 6 | 4 | 4 | 14 | 0.05 | 0.00 | 0.01 | 0.06 | 0.17 |
| 8 | 24 | 59 | 16 | 99 | 0.19 | 0.01 | 0.02 | 0.22 | 1.19 |
| 9 | 0 | 1 | 0 | 1 | 0.00 | 0.00 | 0.00 | 0.00 | 0.01 |
| Total | 414 | 1807 | 1000 | 3221 | 12 | 0 | 0 | 12.52 | 38.65 |

FIG. 25 is a flowchart for the reader/interrogator process just outlined, henceforth technique 1. The process block 174 begins the routine. Assume that the previous routine, FIG. 24, to determine the approximate number of tags in the tag field has been run, and this data is used to compute $n_{est\_opt}$ which is sent to all the tags in the tag field. Process 174 initializes any other variables that need to be initialized and control flows to process block 176 where a read command is sent to the tags in the tag field. Upon a successful read of a tag's data, this data is recorded, and the appropriate counters for $n_e$, $n_c$, $n_x$, and $n_t$ are incremented. In conditional block 178, it looks to see if the number of timeslots is equal to $n_{est\_opt}$. If it isn't, the iteration isn't complete, and the control flow goes back to process block 176 where it sends another read command. If $n_t$ is equal to $n_{est\_opt}$, this iteration is finished, and control moves to process block 180 where sends a special command to the tags consisting of a single timeslot read command. If the response is $n_c=0$, and either $n_e=1$, and $n_x=0$ or $n_e=0$, and $n_x=1$ (as determined in conditional process 182), then all the tags in the tag field have been read, and the cycle is finished 184. If the response is something other than this, then additional iterations must be performed and flow goes to 186. In 186, if possible, a new value for $g_{est}$ and $n_{est\_opt}$ is computed using the appropriate equations. If the number of tags in the tag field becomes small, the statistical variation can make either or both $n_x$ and $n_e=0$ leading to a g value of 0 or ∞. In addition, when very small values of $n_x$ and $n_e$ are used, numerical roundoff error becomes large which makes for large errors in g. This in turn may lead to negative numbers for the $n_{est\_opt}$. These conditions are detected in conditional process 188. When one of these things happen, it is necessary to provide a reasonable number for $n_{est\_opt}$ 190 and then begin a new read cycle. In most cases, this kind of error doesn't begin to occur until the number of remaining tags is quite small. It has been found that a number (K in the flowchart process block 190) between 20 and 50 works quite well. In reality almost any number will work.

After a new value for $n_{est\_opt}$ is created using either the classical technique or by assignment of K, flow moves to process block 192 where the new value for $n_{est\_opt}$ is sent to the remaining tags in the tag field and a new iteration begins by moving the control flow back to process block 176 where the read cycle begins anew.

Flowchart, FIG. 26, shows the tag responses to a reader/interrogator using the aforementioned "technique 1" FIG. 25. In process block 196 it waits until it receives a value for $n_{est\_opt}$ which it uses to scale its random number to create an integer valued random number ($R_n$) that lies between 1 and $n_{est\_opt}$. It resets its timeslot counter to zero and moves the flow of control to the conditional process 198. Here, the tag process waits until it receives a new read command from the reader/interrogator. When it does, the tag process increments timeslot counter 200 and compares the output of this counter ($c_n$) against $R_n$ in conditional process 202. If $c_n$ is not equal to $R_n$ then it checks to see if the reader/interrogator has sent a new value for $n_{est\_opt}$ (in control process 204) and if it has not control moves to conditional process 198 where it waits for the next read command from the reader/interrogator. If the tag did get a new value for $n_{est\_opt}$ from the reader/interrogator it recalculates $R_n$ in process block 214 and moves the flow of control back to process 198 where it waits for another read command from the reader/interrogator. Back up in conditional process 202, if $c_n=R_n$ it immediately attempts to communicate its data to the reader/interrogator in process 206. In conditional process 208, it waits to see if the read was successful (if so the reader/interrogator sends a read acknowledge command in process 210; if it's not successful, it sends a read not-acknowledge command). If it is successful, it goes off line until it is called by the reader/interrogator 210. If it was unsuccessful, it checks to see if it received a new value for $n_{est\_opt}$ from the reader/interrogator in conditional process 212. If so, it re-computes its value for $R_n$ in process block 214 and then flows to 198 where it waits for the next read command. If not, it remains in conditional process 212 until it does receive a new value for $n_{est\_opt}$ as it must remain off line for the remainder of this iteration.

There is a variant to the above approach, hereafter "technique 2", that modifies a couple of the steps. The above system cycles through a complete set of read cycles giving each tag one and only one shot at communication during a particular cycle (also referred to as an iteration). If the tag has a collision with another tag, both tags must not try again until the next iteration.

A different but equivalent technique is to have the tag, if it is in collision with another tag with the resulting loss of communication, pick a new random number that is currently between the present value of its counter (indicating the current timeslot) and the last timeslot indicated by the value of $n_{est}$. It then continues as before incrementing its counter for each new read command and when the value of its counter $c_n$ becomes equal to its new value for $r_n$ it attempts to communicate again. This becomes a continuous process where each tag continues to attempt to communicate until it is successful.

To make this work, the value for the $n_{est}$ that was determined by the reader/interrogator must be increased. If one assumes that the system is operated at the optimum point, then the number of timeslots needed, on average, to read $n_{act}$ tags is $n_{t\_opt}$ and this is given by:

$$n_{t\_opt} = \frac{n_{act}\varepsilon^{g_{opt}}}{g_{opt}}$$

Assuming the same example as before; the first 50 tag are read to determine that the remaining number of tags is 1000. The optimum value for g was 0.58. Substituting these numbers into the equation for $n_{t\_opt}$ gives:

$$n_{t\_opt} = \frac{n_{act}\varepsilon^{g_{opt}}}{g_{opt}}\bigg|_{\{g_{opt} \to 0.58\}} = \frac{1000\varepsilon^{0.58}}{0.58} = 3080$$

This says that on average, 3080 timeslots will be needed to read 1000 tags at the optimum point. $n_{est}$ is set to $n_{t\_opt}$ (3080) and sent to the tags so that they can use this value to create their random number. In technique 1, $n_{est}$ was set equal to the estimate of the actual total number of tags $n_{act}$. In technique 2, $n_{est}$ is set equal to the number of timeslots that are needed to read the total number of tags $n_{act}$, on average $n_{t\_opt}$. By having additional timeslots available beyond the number of tags in the system, if a tag has a collision, it has plenty of other timeslots for a second chance.

This technique is simpler than technique 1, but it has the disadvantage of requiring the system be operated at the optimum point. The number of timeslots needed is calculated at the optimum point. If due to statistical error, the system is not operated at optimum, then the number of timeslots needed will increase. This increase may be dramatic, if g is far from optimum, increasing the amount of time needed to read the tag field. However, the increase in time is small if the inventions variable width timeslot. If either g is estimated too small or if the beginning number of tags is estimated too high, a number of unnecessary empty timeslots are produced. But these are the timeslots that require the least amount of time to process. In addition, technique 1 has most of its tags collected during iteration 1, so if the estimate is off in the same way, it too will create unnecessary empty timeslots. Both techniques may make use of an additional process that keeps track of the value for g, and if g drifts too far from optimum it can interrupt the iteration to give the tags a new value for $g_{est\_opt}$. While technique 2 appears simpler, these two techniques really are quite similar in performance. The selection of one over the other (along with any number of other variants) depends on economics. For example, some existing tags are likely to support one of these features, but not both.

FIG. 27 is a flow chart for the tag process as done for technique 2. Observe that the only difference between this process and the technique 1 process of FIG. 26 is the flow out of process 216 (212 in FIG. 26). This time, if conditional process 208 produces a no answer, flow goes to 216 where the tag immediately computes a new value for $r_n$ that lies between the current timeslot number and $n_{est\_opt}$ and then jumps back into the flow to wait for its number to be called again. In technique 1, it simply waited for a new iteration to roll around. In technique 2, it doesn't wait. Other than these two differences, the two systems operate identically. They also produce identical results.

In order to provide proof of concept and to verify the previous theory, simulation software was developed that simulated in software as closely as possible techniques 1 and 2 above. It was data from these simulation programs that produced tables 1 and 2 above and the graphs of FIGS. 22 and 23. FIGS. 29 through 38 illustrate graphs of the number of tags acquired during each iteration for technique 1. This includes offered rates for g of 0.58 and 1, and initial estimate $n_{est}$ of ½, 1 and 4 times the actual number, $n_{act}$, as well as values for the actual number $n_{act}$ of 100, 1000, and 10,000. A theoretical plot is included in each that shows the theoretically predicted value would be obtained for each of these conditions. Observe how all the simulations closely tracked the predicted value, albeit with statistical variation at any particular iteration number. Table 3 shows the relationship of these variables to each of the drawings.

TABLE 3

Shows g, beginning estimate for number of tags and the actual number of tags for FIGS. 29 through 39

| Figure number | g | Beginning estimate for number of tags | Actual number of tags |
| --- | --- | --- | --- |
| 29 | 0.58 | 1000 | 1000 |
| 30 | 1 | 1000 | 1000 |
| 31 | 1 | 500 | 1000 |
| 32 | 1 | 4000 | 1000 |
| 33 | 0.58 | 500 | 1000 |
| 34 | 0.58 | 4000 | 1000 |
| 35 | 1 | 100 | 100 |
| 36 | 0.58 | 100 | 100 |
| 37 | 0.58 | 10,000 | 10,000 |
| 38 | 1 | 10,000 | 10,000 |

FIG. 39 is a graph of simulation data showing the time to acquire 1000 tags, using the invention (technique 1 or 2) vs. a Slotted Aloha, for offered rates g (0.58 and 1), and values for the original estimate of the number of tags in the tag field (500, 1000, and 4000). Observe how the time to acquire 1000 tags using the invention is almost independent of the value for g for the initial estimate. This shows that estimates of g do not need to be close to the optimal value of g to achieve high throughput. The time to read 1000 tags ranges from 12.9 seconds to 13.68 seconds; a difference of less than 6%. The Aloha network, on the other hand, ranges from 38.27 seconds to 97.38 seconds; a difference of nearly 61%. In all cases, the time required by the invention, is markedly less than slotted Aloha. This large time variation in the Aloha network demonstrates that the estimate for $n_{act}$ are critical if short acquisition times are to be realized.

Access to the tag's location relative to the reader/interrogator produces a reliable source of random numbers. Computing a tag's random number using the tag's location in space yields a tag unique value for $r_n$ under ideal conditions, since no two tags can occupy the same physical space. This means there will be no collisions because each tag will have a unique random number. Since it takes longer to detect a collision than it does to detect an empty timeslot, the total time to read a given tag field is reduced. Many existing tags are not capable of listening at the same time as they are talking, rendering timeslot shortening unavailable in the event of a collision. If the tag being used cannot talk and listen at the same time, and special protocols (required to achieve timeslot shortening in the event of a collision) are not available, then it really isn't possible for the value of $e_{tc}$ to be less than $t_s$. In this case, the ability to prevent collisions is highly desirable. If collisions can be prevented, then all timeslots are either empty (and can be shortened) or they contain valid tag data that can be successfully read.

For example, assume a system where $t_s=e_{tc}=0.012$ seconds, $e_{te}=0.00025$ seconds, a g value of 1, and with a tag estimate exactly equal to the actual number of tags in the tag field. The average number of empty timeslots to read 1000 tags is 1000, and the average number of collisions is 718, in all 2718 timeslots. Using these numbers for $t_s$, $e_{tc}$, and $e_{te}$ it requires 12 seconds to read the 1000 tags, 8.616 seconds to read the collided timeslots, and 0.25 seconds to read the empty timeslots for a total of 20.866 seconds. If location is used as the source of uniformly distributed random numbers and the estimate for the number of tags exactly equals the actual number of tags, then there will be no empty timeslots and no collided timeslots. There will be exactly 1000 timeslots with a single tags information in each. The total time to read 1000 tags is only 12 seconds, saving 8.66 seconds. In technique 1 or 2 above, a system operated at a g value of 0.188 (which is the optimal value for g with $t_s=e_{tc}=12$ ms and $e_{te}=0.25$ ms) then the time to read 1000 tags is 14.57 seconds. This is 21.4% longer than the value of 12 seconds required if the tags all have a unique number. This is equivalent to saying that with timeslot shortening, a binary search algorithm operates at the same tag read rate on a sparsely populated space as it does on a fully populated space, a rate approaching the maximum rate the underlying communication channel will support.

There are many ways to create unique tag identification numbers, through different random number generators or number assignment at time of manufacture, all of which will work with the invention. Another way of generating random numbers is based on tag location as follows: Possible variables suitable for use in location dependent random number selection include Angle, Signal Strength and Polarization. Angle is measured at the reader/interrogator, while Signal Strength and Polarization can be determined either by the tag, or by the reader/interrogator and communicated to the tags.

The value of this approach to generating a random number is that each tag must actually occupy a unique position in space. Assuming that the ability to measure the location has sufficient resolution, and that the value for $n_t$ is greater than the total number of tags in the tag field, a unique timeslot selection for each tag is assured; something that the classical random number generator technique cannot provide. The advantage of having a unique timeslot for each tag is that there will be no collisions when the reader is attempting to read all the tags in the tag field as long the number of timeslots, $n_t$, is greater than the total number of tags.

Even with insufficient resolution in the measurement of the individual tag location to assure a unique random number, the statistics may still be such that the resulting timeslot distribution contains fewer duplicates than would occur through the use of a discrete random number generator, resulting in fewer collisions.

One possible detailed technique (out of many) for determining the random number through location measurement assumes that the reader/interrogator transmits to the tag field using a directional antenna, which also has the ability to change polarization. The reader/interrogator transmitted power is also adjustable. Using an antenna with 15 dB of gain, whose direction can be changed in 11.25 degree increments yielding 32 discrete positions around a circle; a reader/interrogator whose power may be changed in 32 discernable levels; and an antenna which can transmit either polarity to the tags results in 2048 different discrimination levels. This system has the ability to create completely independent numbers for 2048 different tags.

FIG. 6 is a block diagram illustrating the process of creating random numbers using location 112. In this figure, the reader/interrogator 110 may point its antenna in any direction as represented by the lines with arrows pointing to individual tags 108. Each of the arrows has a different direction and a different length (indicating distance to the tag). It is apparent from this diagram, that if each tag actually has a different location from all other tags, then each of the vectors from the reader/interrogator to each tag must be unique in length (signal strength or any other measure that may be used to measure distance) and direction. The number of tags that can be differentiated in this way is limited only by the resolution of measurement in these two parameters. While the above resolution of 32 different direction increments, 2 polarizations and 32 different signal strengths results in 2048 unique numbers, it is entirely possible to visualize a system where there are 64 different values for direction, 4 polarizations, and 64 or more signal strength levels. The number of values created in this manner are limited only by hardware complexity and economics allowances.

It may be desirable, under some circumstances, to decrease the resolution. Suppose that the system was never going to have more than 100 total tags in the tag field. Under this circumstance, using 2048 possible tags consumes time in the initial setup and programming of the tags. To keep throughput high, a smaller set of direction, signal strength and polarization numbers, perhaps only 150, would be enough to handle the worst case of 100. Programming would be faster, since there are only 150 different cases to cycle through instead of 2048. As discussed elsewhere, programming time for getting the tags the location information would drop from 655 to 48 ms. A system designer would want to make these parameters programmable to accommodate the various size tag fields.

The variation in signal power available to the tag, and reflected back to the reader/interrogator falls off with distance between 2nd and $4^{th}$ order in each direction, so even if transmitted power is held constant, it is possible to get differentiation based on power falling off as a function of distance from the transmitter. Simultaneously adjusting power and looking for power fall off with distance (the tag can measure its Receive Strength Sensitivity Indicator) yields additional resolution.

Pointing the antenna in a particular direction and transmitting at a particular power level and with a particular polarization, only those tags with the same polarization as the reader/interrogator antenna; in the antenna pattern of the transmitter, and receive a sufficiently strong signal from the transmitter will process this signal. If the transmitter begins with very low power, only those tags close to the transmitter will hear the signal. The rapid fall off of signal power with distance assures that, a very short distance from the transmitter, power will be insufficient to allow the tags to receive any data. Using RSSI, this strong power gradient with distance provides a source of additional spatial measurement resolution.

As an example, the reader/interrogator begins by transmitting at its lowest power setting, in a particular direction and with a particular polarization. It combines its polarization information, its directional information (as a number between 0 and 31) and its power transmission (as a number between 0 and 31) and transmits this information to the tags as one eleven-bit digital word. Any tag that can hear this message uses this number as the basis of its unique random number. As noted earlier, 11 bits is sufficient to discriminate 2048 separate tags. However, the tags may add additional RSSI information. Assume that they can resolve an additional 3 bits of signal strength information. These three additional bits are concatenated to the 11-bit position word that was transmitted by the reader/interrogator, giving a total of 14 bits of position information with which to discriminate their location; a total of 16,384 separate numbers.

For reasons shown below, the bit order for the complete word should be:

| 5 Bits Direction Information | 5 Bits Signal Strength Information | 3 Bits RSSI Information | 1 Bit Polarization |
|---|---|---|---|

In summary, all of the tags that can hear the reader/interrogator during this transmission, now measure their signal strength (RSSI) and convert it to three more bits of position information. They concatenate this received signal strength with the position vector sent to them by the reader/interrogator and then accept this as their unique random number storing it away for future reference. They no longer participate in creating a new random number as they already have theirs.

After the reader/interrogator has transmitted its first direction, polarization, and signal strength level to the first set of tags that can hear the transmission, it increments its power by one unit and repeats the process. It does this until all 32 available power levels have been used. It then changes its antenna polarization and runs through all the power levels again with a new location vector that differs from the others because the polarization number has changed. A new set of tags now hear the transmission because their antenna polarization now matches the reader/interrogator antenna polarization. Conversely, the old set of tags no longer hear the transmission as their antenna polarization no longer matches the transmitters' polarization. After all of the power levels have been run through, the reader/interrogator turns the antenna 11.25 degrees and begins the process all over again with a new set of tags in a new direction. It continues the process until it has rotated in a complete circle and gone through all 2048 separate position vectors. At this time, all tags have their unique random number stored and ready for use.

Now each tag has a unique number (in an ideal world) that is scaled between 1 and 16,384 however to the reader/interrogator may send a different $n_{est\_opt}$ to the tags and have them scale to this number. If there are fewer tags in the tag field, there will be unused timeslots. For example, suppose that there are really only 512 tags in the tag field. Then for each tag, there are 32 empty timeslots, but there is the risk of creating duplicates since the numbers carry location information. For example, suppose all the bits representing direction were dropped. While this would scale the 16384 down by a factor of 32, it would increase the likelihood that many of the remaining tags would have duplicate random numbers because the only parameters left are signal strength and polarization. Many of the tags would have the same number for signal strength. (There would actually be a "ring" around the reader/interrogator where all the tags would have essentially the same number). In this situation the best way to scale is to assume that the tags are randomly distributed and then scale each directional parameter by the same amount. If they are randomly distributed, then the result should preserve the uniqueness of the random numbers.

By way of example, begin with the assumption that for a fully loaded system 16384 unique numbers can be associated with the same number of tags. Pick one of those tags that just happens to have the following position information: 21:6:3:1. In other words, it was located at direction 21 (out of 32), at a signal power level of 6 (out of 32), with a measured signal strength (RSSI) of 3 (out of 8), and an antenna polarization of 1. Converting these to binary, yields: 10101:00110:011:1 for direction, power, RSSI, and polarization. Concatenating gives: 10101001100111. Converting this back to decimal gives a value of: 10,855. In other words, this tag's unique random number is 10,855 out of a total of 16,384.

Now suppose that it is estimated that the number of tags in the tag field is 5462 instead of 16,384 or more specifically that the number of actual tags is approximately ⅓ (5462/16384) of the original beginning estimate of 16,384. This can now be scaled in two ways. The first is to simply multiply the original tag random number by ⅓ or $$\frac{10855}{3} = 3618.33$$

The second technique is to go back and scale the individual position values by ⅓. Doing this gives a new direction value of 21/3=7, a new transmitted power level of 6/3=2, and a new received signal strength, RSSI of 3/3=1. Nothing is done with the polarization information because it has only two values (zero and one). Therefore, it can't be scaled. Because it does represent half the tags in the system, it can't be dropped. However, by making it the LSB, it has little effect on the actual value of the random number. The new set of numbers become: 7:2:1:1. Converting to binary, the number becomes: 00111000100011 which, converted back to decimal, becomes 3619, basically the same as we got by scaling the decimal value by ⅓. So these two techniques are essentially similar (there are sometimes differences in not scaling the polarization information, and in addition, the scaling process has inherent rounding errors).

The reader/interrogator may send the tags the divisor rather than the final number, depending on the tag design. Finally, when scaling is being done, and it comes time to round, round up. This ensures that the number of timeslots is always greater than the actual number of tags, and will prevent the system from having collisions because of an insufficient number of timeslots.

Consideration should be given to the tag field size. If it is certain that the tag field size is small, it may be inappropriate to spend time sending high resolution location data to the tags to set up a read cycle. The potential time saved by guaranteeing no collisions has to be balanced against the time needed to send the location data. For example, consider a system where the uplink bit rate is limited to 10.6 KHz, the downlink rate is 50 KHz, and using 2048 location numbers. Assume that with some instruction overhead, that a total of 16 bits must be transmitted from the reader/interrogator to the tags for each possible of these 2048 location numbers. The time per transmission is 0.32 ms and the total transmission time is 655 ms.

Now read 1000 tags from a tag field that has been preprogrammed with location information. Assume that it requires 12 ms to read each tag's data when an uplink bit rate of 10.6 kHz is used to upload 128 bits of tag information. Further assume that $e_{te}$=0.25 ms, and $e_{tc}$ is non-existent because there are no collisions. At best, with a 1000 tags being read in 1000 timeslots, the time to read the tags is 12 seconds plus the original programming time of 0.655 seconds to make a total of 12.655 seconds. Even if off by a factor of 2 on the tag estimate ($n_{est}$=2000 tags when only 1000 were present) the total time would only be 12.905 seconds. Now consider the case where the tags are not preprogrammed. Further assume that $e_{tc}$ is equal to 12 ms. If g is equal to 1 under this circumstance, the time to read all 1000 tags is 20.7 seconds. If g is set to the optimum value of 0.187 for this condition, then the time to read 1000 tags drops to 14.46 seconds; still substantially longer that the 12.9 seconds required when location information is used. If $e_{tc}$=1 ms and g=0.58 (the optimum point for this case), and an estimated total number of tags of 2000 for an actual number of 1000 it is found that the total time is 13.17 seconds. Only under the most optimum of circumstances do the times become comparable.

In conclusion, using location information may save time, depending on the total number of tags in the tag field. The time to program is essentially fixed (except as discussed earlier where the ability to select the granularity of the position information is built into the system design). For large tag fields, it is more efficient to use location information to create random numbers; especially if $e_{tc}$ cannot be easily changed to be less than $t_s$. By using location information to create the random number on the tags, the vast majority of unsuccessful reads will be due to empty timeslots rather than collisions. Because it is much easier to sense silence rather than a collision, the time to read non-successful timeslots is much shorter.

Of interest is the statistics. If the system is operated with a tag estimate greater than the actual number of tags, then there should never be a collision. The total time to read all the tags in the tag field becomes:

$$T_{ms} = N_{act} t_s + (n_{est} - N_{act}) e_{te}$$
$$= N_{act}\left[t_s + \left(\frac{n_{est}}{N_{act}} - 1\right) e_{te}\right]$$

Where $t_{ms}$ is the time to read $n_{act}$ tags with an original estimate of $n_{est}$, a time to read a tag equal to $t_s$, and the time to read an empty timeslot is $e_{te}$. For this equation to be valid, $n_{est} \geq N_{act}$. If this is not so then collisions result, and the time to read the tags increases dramatically. Note that there is no offered rate g in this equation.

Throughput becomes:

$$t_{ps} = \frac{N_{act}}{N_{act} t_s + (n_{est} - N_{act}) e_{te}}$$
$$= \frac{1}{t_s + e_{te}\left(\frac{n_{est}}{N_{act}} - 1\right)}$$

From this, it is clear that if the estimate for the number of tags in the tag field is equal to the actual number, the throughput is equal to the maximum bit rate allowed by the communications channel itself.

Using the information about total tag field size from the earlier part of the invention allows us to provide a just sufficient number of timeslots to handle all of the unique tags. This makes the throughput dependent only on the bit rate capabilities of the channel. If the estimates are a little off, then the shortened timeslot technique will ameliorate the effect of any extra timeslots generated.

FIGS. 16 through 20 illustrate the throughput characteristics of the location based random number technique. Because g is no longer a factor as long as the estimate number of tags is greater than the actual number of tags, the curves look different that the those for the previous part of the invention. FIG. 16 shows the throughput in tags/second versus the ratio of $$\frac{n_{est}}{N_{act}}$$

for three different values of $e_{te}$ ($e_{te}$=0.25 ms; $e_{te}$=1 ms; and $e_{te}$=2.5 ms). Notice that they all converge to a single point when $$\frac{n_{est}}{N_{act}} = 1.$$

That point is 83.33 tags/second. This amount of throughput is the maximum that the communications link is capable of supporting (in this example). When $$\frac{n_{est}}{N_{act}} = 1,$$

it means all available timeslots are each filled with one tag's data. It is best to give some margin to this ratio especially if the tag population is not exactly known but is only an estimate. For example, making the ratio of $$\frac{n_{est}}{N_{act}} = 2,$$

the initial estimate is twice the number of tags as the actual number and twice the timeslots have to be read to complete the process. However, looking at FIG. 16, it is clear that the use of shortened timeslots will largely ameliorate the effects of too many empty timeslots. Looking at FIG. 16 and at the dashed line showing the throughput for the case of $e_{te}$=0.25 ms to be 81.63 tags/second; there is less than 2 tags/sec difference between an original estimate of $n_{est}$=$N_{act}$ and $n_{est}$=2×$N_{act}$. Even if $n_{est}/N_{act}$=10, the throughput never drops below 70.1 tags/second. If $e_{te}$ becomes larger, then the throughput decreases proportionally to this increase. Furthermore, if $e_{te}$ is increased to 1 ms, with $$\frac{n_{est}}{N_{act}} = 2,$$

the throughput is still equal to 76.9 tags/second, and when $e_{te}$ is equal to a very long 2.5 ms, the throughput is 68.96 tags/second.

FIG. 17 graphically illustrates the seconds/tag under the same conditions as the throughput graph of FIG. 16. In fact, this graph is the reciprocal of the tags/sec shown in FIG. 16. Observe how all the lines converge to a value of $t_s$. Remember $t_s$ is the width of the basic timeslot of the communications link itself. This once again shows the fact that this technique has the potential to produce throughput right at the maximum allowed by the communication link.

FIG. 18 graphically illustrates the total time, $T_{ms}$, required to read 1000 tags when the location based random number technique is employed. It is equal to the variables in FIG. 17 multiplied by 1000. FIG. 19 shows $a_{tt}$ the time/timeslot for this technique. If the ratio of $n_{est}/N_{act}$ is 1, then all the curves for $a_{tt}$ converge to the same value of $t_s$.

FIG. 20 graphically illustrates the throughput improvement, speed up factor $S_{uf}$, 146 over that of a slotted Aloha vs. the offered rate g 64, for two separate values of the ratio's of $n_{est}/N_{act}$ (1, 2) and for three different values of $e_{te}$ (0.25 ms, 1 ms, and 2.5 ms). When $n_{est}/N_{act}=1$, we don't care about $e_{te}$ because the throughput for the invention in this situation is independent of these variables, being equal to $1/t_s$; the maximum throughput allowed by the communications link. When the ratio of $n_{est}/N_{act}=2$, the throughput is a function of $e_{te}$. Specifically, for $e_{te}=0.25$ ms, $t_{ps}=81.6$ tags/sec; for $e_{te}=1$ ms, $t_{ps}=76.92$ tags/sec; and for $e_{te}=2.5$ ms, $t_{ps}=68.96$ tags/second. From this figure, it is clear that providing margin by letting $n_{est}/N_{act}=2$ has little impact on performance. Comparing this to FIG. 15 (a plot of the speedup factor in speed 144 vs. the offered rate g 64 for techniques 1 and 2), it is clear that when location based random number assignment is used, the performance improvement over the slotted Aloha just keeps improving as g 64 gets smaller, whereas the performance improvement in FIG. 15 approaches a limit for small values of g.

The throughput of the location based random number assignment will benefit from combining with the algorithm to estimate the total tag size. Begin by using the standard random number generator and run the tag estimate algorithm described and depicted in FIG. 24. This estimate of the size of the tag field may be used to "tune" the technique of creating a random number by using location. Assume that the estimate for the maximum size of the tag field (after taking into account statistical variation) is 500 tags. Then make 500 the largest possible number for the location parameters. Instead of using 32 different values for location and 32 different values for signal strength, use 16 different values for each. Along with the polarization bit, this results in a total of 512 different timeslots covering the absolute maximum of 500.

The time to program the individual tags with location information for their new random number process is reduced by a factor of 4 bringing the programming time from 0.655 seconds down to 0.164 seconds. Having an accurate estimate for the actual number of tags in the tag field, it is not unreasonable to read all the tags at a rate near that of $t_s$ per tag. If $t_s=0.012$ ms, then the time to read the 500 tags is: $t_{ms}=6$ seconds, and the total time including programming is 6.164 seconds. Simulation shows that at the optimum point selected (g=0.58), the invention without this feature requires about 6.43 seconds, a savings of 0.266 seconds. While this may not seem like much, in very large tag fields, this time could become significant.

The invention may be embodied in other specific forms without departing from its spirit or essential characteristics. The described embodiments are to be considered in all respect only as illustrative and not restrictive. The scope of the invention is, therefore, indicated by the appended claims, rather than by the foregoing description. All changes which come within the meaning and range of equivalency of the claims are to be embraced within their scope.

The invention is not limited to use in radio frequency identification systems and is understood by those skilled in the art that time slot shortening as described in this invention can be applied to other areas of communications technology where data collisions occur, especially with packet data transmissions where speed up factors of improvement can reach the fundamental bandwidth limitation of the channel.

What is claimed is:

1. A method for estimating a total number of RFID Tags in an unknown RFID Tag Field using an interrogator/reader, the method comprising the steps of:
    (a) storing a predefined random number within each individual RFID Tag wherein said predefined random number is scaled between 1 and a "Number" and each individual RFID Tag having an internal counter for changing a number and each defines a timeslot;
    (b) estimating the total number of RFID tags in the unknown RFID Tag Field by sending a first "Number" generated by the interrogator/reader to the RFID Tag Field wherein each individual RFID Tag uses said "Number" to dimension a space of numbers from which each individual RFID Tag randomly chooses one of said numbers from said space of numbers and stores said chosen random number;
    (c) sending a series of read commands from thee reader/interrogator to the unknown RFID Tag Field until a Preselected Number of successful tag reads have occurred wherein with each associated read command said internal counter is incremented and compared against said a random number for each individual RFID Tag wherein each individual RFID Tag will not attempt to communicate to the interrogator/reader unless said incremented internal counter has a number with a Predefined Relationship to said chosen random number;
    (d) inferring the size of the RFID Tag Field by using the ratio between successful and empty timeslots multiplied by said "Number" minus said Preselected Number wherein the interrogator/reader counts the number of empty timeslots that occurred while obtaining said Preselected Number of successful tag reads.
    (e) following the inferring step, calculating a value for producing an offered rate for maximizing throughput in a slotted Aloha network using a relationship between time durations of empty and collided timeslots for determining a value for the offered rate in the slotted Aloha network when using timeslot shortening to increase throughput allowing RFID Tags in the RFID Tag Field to be read in the least amount of time; and
    (f) computing a ratio of the difference in durations between said empty and collided timeslots and a scaled duration of a collided timeslot; operating on this ratio through a Product log function and adding 1 to obtain a desired value of said offered rate.

2. The method of claim 1 wherein said "Number" the interrogator/reader sends is a number different than possible number of RFID Tags in the RFID Tag Field.

3. The method of claim 1 wherein said "Number" the interrogator/reader sends is a number different than the needed number of Aloha Timeslots.

4. The method of claim 1 wherein said Preselected Number of successful tag reads used is chosen at design time to optimize speed and accuracy.

5. The method of claim 1 wherein said Preselected Number of successful tag reads used is chosen at installation time to optimize speed and accuracy.

6. A method of claim 1 wherein said Predefined Relationship is equivalence.

7. A method of claim 1 wherein said Predefined Relationship is that one greater than the other.

8. The method of claim 1 wherein allowed throughput is increased by an Aloha architecture by shorting time periods of empty time slots, further comprising; sending a read command to the RFID Tag Field wherein, the interrogator/reader listens for a response from any tag for a duration of time less than a time required to read a successful tag wherein if the interrogator/reader does not hear a response within a period of time sufficient to know that no response is going to be sent, it terminates said time slot early by sending another read command.

9. The method of claim 1 wherein allowed throughput is increased by an Aloha architecture by shorting said time periods of collided time slots, further comprising; sending a read command to the tag field wherein the interrogator/reader listens for a response from any tag for a duration of time less than a time required to read a successful tag and long enough to determine that said timeslot is not empty and does not contain a valid message wherein the interrogator/reader determines that a timeslot contains a collided message by observing a portion of a transmission from the RFID Tag and sends a continue command in an event said message is valid and a new read command if said message is invalid.

10. The method of claim 1 wherein allowed throughput is increased by an Aloha architecture by shortening said time periods of empty and collided timeslots.

11. The method of claim 1 wherein the RFID Tag response within a given timeslot is controlled by a random number generated from an individual RFID tag's location.

12. The method of claim 1 utilizing the estimated value of the RFID Tag Field size for maximizing throughput for reading all RFID tags in the RFID Tag Field.

13. A method in a slotted Aloha network to read all RFID tags in an RFID tag field in a least amount of time by first using determined values for optimized value of an offered rate and estimating a Field Size, comprising:
   (a) computing the optimized value of an estimate of Field Size for maximum read throughput by dividing a total estimated number Field Size by the optimized offered rate;
   (b) sending by an interrogator/reader, the optimized value of the estimate of Field Size for maximum read throughput to each tag in the tag field and using this number as a maximum for scaling, the tags choose an internal Random Number scaled between 1 and the optimized value of the estimate of the Field Size for maximum read throughput;
   (c) incrementing an internal counter each time a read command is received from the interrogator/reader, the tag attempts to communicate with the interrogator/reader when the relationship between the counter and the internal Random Number is a Predefined Relationship;
   (d) if the attempt is unsuccessful, then it is assumed that a collision resulted and the tag takes a Predetermined Action;
   (e) the interrogator/reader keeps track of the total number of successful time slots read, the total number of empty timeslots that occurred, and the total number of collided time slots that occurred during a particular set of read cycles;
   (f) calculating, at the end of a particular set of read cycles, a new estimate for the remaining number of tags in the tag field using the values of the total number of empty timeslots, and the total number of successful time slots that it counted during the last set of read cycles and iteratively looping back to (b) until the estimated number of remaining tags is in a Preset Range; and
   (g) using the Preset Range for the optimized value of the estimate of the Field Size for maximum read throughput until the reader/interrogator has determined that all tags in the tag field have been read.

14. The method of claim 13 wherein the Field Size is determined by number of tags and the Predetermined Action is that the tag goes into a wait state until the next set of read cycles occur.

15. The method of claim 13 wherein the Field Size is determined by number of time slots and the Predetermined Action is that the tag chooses a new random number that lies between its current value and the optimized value of the estimate of the total number of time slots for maximum read throughput.

16. The method of claim 13 wherein the Predefined Relationship is equivalence.

17. The method of claim 13 wherein the Predefined Relationship is that one greater than the other.

* * * * *